US012368753B2

(12) United States Patent
Ford

(10) Patent No.: US 12,368,753 B2
(45) Date of Patent: *Jul. 22, 2025

(54) METHODS AND APPARATUS FOR DETECTING A PRESENCE OF A MALICIOUS APPLICATION

(71) Applicant: SunStone Information Defense, Inc., Jamestown, OH (US)

(72) Inventor: David K. Ford, Jamestown, OH (US)

(73) Assignee: SunStone Information Defense, Inc., Jamestown, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/613,738

(22) Filed: Mar. 22, 2024

(65) Prior Publication Data

US 2024/0236146 A1    Jul. 11, 2024

Related U.S. Application Data

(63) Continuation of application No. 17/699,820, filed on Mar. 21, 2022, now Pat. No. 11,943,255, which is a
(Continued)

(51) Int. Cl.
H04L 9/40 (2022.01)
G06F 21/55 (2013.01)
G06F 21/71 (2013.01)

(52) U.S. Cl.
CPC ........ H04L 63/1466 (2013.01); G06F 21/552 (2013.01); G06F 21/71 (2013.01);
(Continued)

(58) Field of Classification Search
CPC . H04L 63/1466; H04L 63/123; G06F 21/552; G06F 21/71; G06F 2221/032; G06F 2221/2101; G06F 2221/21; G06F 2221/19
See application file for complete search history.

(56) References Cited

U.S. PATENT DOCUMENTS

| 6,178,510 B1 | 1/2001 | O'Connor et al. |
| 7,039,946 B1 | 5/2006 | Binding et al. |
(Continued)

FOREIGN PATENT DOCUMENTS

| AU | 2011200413 B1 | 9/2011 |
| CA | 2510633 A1 | 12/2006 |
(Continued)

OTHER PUBLICATIONS

Ahmed, et al.; "A New Biometric Technology Based on Mouse Dynamics", pp. 165-179, Jul.-Sep. 2007 IEEE Transactions on Dependable and Secure Computing, vol. 4, No. 3—15 Pages.
(Continued)

Primary Examiner — Khoi V Le
(74) Attorney, Agent, or Firm — K&L Gates LLP

(57) ABSTRACT

Methods, systems, and apparatuses for detecting a presence of a malicious application are disclosed. In an example, a method includes storing information to a data structure as a predicted response from a client device. The information is indicative of graphically rendered text or images at the client device corresponding to transactional information and presentation information of a website. The method also includes, during a subsequent access of the website, selecting the transactional information and the presentation information to transmit to the client device. The method further includes receiving second information indicative of graphically rendered text or images at the client device, comparing the second information to the stored predicted response, and determining a malicious application is attempting to affect the controlled usage of a website resource or a second website resource when the received second information does not match the stored predicted response.

20 Claims, 15 Drawing Sheets

Related U.S. Application Data continuation of application No. 17/208,783, filed on Mar. 22, 2021, now Pat. No. 11,283,833, which is a continuation of application No. 16/298,537, filed on Mar. 11, 2019, now Pat. No. 10,958,682, which is a continuation of application No. 14/841,083, filed on Aug. 31, 2015, now Pat. No. 10,230,759, which is a continuation of application No. 13/623,556, filed on Sep. 20, 2012, now Pat. No. 9,122,870.

(60) Provisional application No. 61/557,733, filed on Nov. 9, 2011, provisional application No. 61/537,380, filed on Sep. 21, 2011.

(52) U.S. Cl.
CPC ............ *G06F 2221/032* (2013.01); *G06F 2221/2101* (2013.01); *G06F 2221/2119* (2013.01); *H04L 63/123* (2013.01)

(56) References Cited

U.S. PATENT DOCUMENTS

| | | | |
|---|---|---|---|
| 7,162,475 B2 | 1/2007 | Ackerman | |
| 7,584,128 B2 | 9/2009 | Mason et al. | |
| 7,650,491 B2 | 1/2010 | Craft | |
| 7,827,311 B2 | 11/2010 | Cooley et al. | |
| 7,908,645 B2 | 3/2011 | Varghese et al. | |
| 8,020,193 B2 | 9/2011 | Bhola | |
| 8,239,836 B1 | 8/2012 | Franz et al. | |
| 8,650,080 B2 | 2/2014 | O'Connell et al. | |
| 8,677,481 B1 | 3/2014 | Lee | |
| 8,689,295 B2 | 4/2014 | Hidalgo | |
| 8,694,993 B1 | 4/2014 | Dotan et al. | |
| 8,756,684 B2 | 6/2014 | Frantz et al. | |
| 8,868,719 B1* | 10/2014 | Satish | H04L 63/102 709/224 |
| 8,869,281 B2 | 10/2014 | Call et al. | |
| 8,938,787 B2 | 1/2015 | Turgeman | |
| 8,949,990 B1 | 2/2015 | Hsieh | |
| 9,009,669 B2 | 4/2015 | Pletter | |
| 9,071,969 B2 | 6/2015 | Turgeman | |
| 9,122,870 B2 | 9/2015 | Ford | |
| 9,154,364 B1 | 10/2015 | Daswani et al. | |
| 9,178,705 B2 | 11/2015 | Roy | |
| 9,270,647 B2 | 2/2016 | Call | |
| 9,270,691 B2 | 2/2016 | Klein et al. | |
| 9,275,337 B2 | 3/2016 | Turgeman et al. | |
| 9,438,625 B1 | 9/2016 | Yang | |
| 9,923,919 B2 | 3/2018 | Call et al. | |
| 10,157,280 B2 | 12/2018 | Amir et al. | |
| 10,230,759 B2 | 3/2019 | Ford | |
| 10,958,682 B2 | 3/2021 | Ford | |
| 2002/0023145 A1 | 2/2002 | Orr et al. | |
| 2002/0174334 A1 | 11/2002 | Ting | |
| 2003/0145226 A1 | 7/2003 | Bruton, III et al. | |
| 2003/0195923 A1 | 10/2003 | Bloch et al. | |
| 2003/0222135 A1 | 12/2003 | Stoutenburg et al. | |
| 2004/0025018 A1 | 2/2004 | Haas et al. | |
| 2004/0039703 A1 | 2/2004 | Novoselsky et al. | |
| 2005/0008148 A1 | 1/2005 | Jacobson | |
| 2005/0283833 A1* | 12/2005 | Lalonde | G06F 21/50 726/22 |
| 2006/0206919 A1 | 9/2006 | Montgomery et al. | |
| 2007/0016949 A1 | 1/2007 | Dunagan | |
| 2007/0030515 A1 | 2/2007 | Adachi | |
| 2007/0240230 A1 | 10/2007 | O'Connell et al. | |
| 2008/0016348 A1 | 1/2008 | Craft et al. | |
| 2008/0134338 A1 | 6/2008 | Chen et al. | |
| 2008/0162200 A1 | 7/2008 | O'Sullivan et al. | |
| 2008/0163128 A1 | 7/2008 | Callanan et al. | |
| 2008/0172741 A1 | 7/2008 | Reumann et al. | |
| 2008/0222736 A1 | 9/2008 | Boodaei et al. | |
| 2008/0244715 A1 | 10/2008 | Pedone | |
| 2008/0319774 A1 | 12/2008 | O'Sullivan et al. | |
| 2008/0319842 A1 | 12/2008 | O'Sullivan et al. | |
| 2008/0320125 A1 | 12/2008 | O'Sullivan et al. | |
| 2009/0024460 A1 | 1/2009 | Willner et al. | |
| 2009/0024461 A1 | 1/2009 | Willner et al. | |
| 2009/0024971 A1 | 1/2009 | Willner et al. | |
| 2009/0064337 A1 | 3/2009 | Chien | |
| 2009/0094690 A1 | 4/2009 | Hayashi | |
| 2009/0113528 A1 | 4/2009 | Ananda et al. | |
| 2009/0222920 A1 | 9/2009 | Chow et al. | |
| 2009/0241196 A1 | 9/2009 | Troyansky et al. | |
| 2010/0007489 A1 | 1/2010 | Misra et al. | |
| 2010/0011446 A1 | 1/2010 | Klucher et al. | |
| 2010/0031139 A1 | 2/2010 | Ihara | |
| 2010/0064369 A1 | 3/2010 | Stolfo et al. | |
| 2010/0080411 A1 | 4/2010 | Deliyannis | |
| 2010/0083163 A1 | 4/2010 | Maghoul et al. | |
| 2010/0088769 A1 | 4/2010 | Ferino et al. | |
| 2010/0100725 A1 | 4/2010 | Ozzie et al. | |
| 2010/0100958 A1 | 4/2010 | Jeremiah | |
| 2010/0102125 A1* | 4/2010 | Gatto | G06Q 20/10 235/492 |
| 2010/0162393 A1 | 6/2010 | Sobel et al. | |
| 2010/0186088 A1 | 7/2010 | Banerjee et al. | |
| 2010/0211893 A1 | 8/2010 | Fanning et al. | |
| 2010/0218253 A1 | 8/2010 | Sutton et al. | |
| 2010/0235908 A1* | 9/2010 | Eynon | H04L 63/1425 726/22 |
| 2010/0251371 A1 | 9/2010 | Brown | |
| 2010/0328074 A1 | 12/2010 | Johnson et al. | |
| 2011/0022559 A1 | 1/2011 | Anderson et al. | |
| 2011/0087870 A1 | 4/2011 | Spangler et al. | |
| 2011/0185421 A1 | 7/2011 | Wittenstein et al. | |
| 2011/0239300 A1 | 9/2011 | Klein et al. | |
| 2011/0282997 A1 | 11/2011 | Prince et al. | |
| 2011/0321151 A1 | 12/2011 | Gluck | |
| 2012/0174218 A1 | 7/2012 | McCoy | |
| 2012/0174224 A1 | 7/2012 | Thomas et al. | |
| 2012/0204257 A1 | 8/2012 | O'Connell et al. | |
| 2012/0216280 A1 | 8/2012 | Zorn et al. | |
| 2012/0304289 A1 | 11/2012 | Hicket et al. | |
| 2013/0254530 A1 | 9/2013 | Amit et al. | |
| 2014/0020083 A1 | 1/2014 | Fetik | |

FOREIGN PATENT DOCUMENTS

| | | | |
|---|---|---|---|
| CA | 2510647 | A1 | 12/2006 |
| CA | 2584940 | A1 | 10/2008 |
| EP | 2199940 | | 6/2010 |
| EP | 2235697 | B1 | 9/2016 |
| JP | 2008257701 | A | 10/2008 |
| KR | 100912794 | B1 | 8/2009 |
| TW | 201141159 | A | 11/2011 |
| WO | WO 2007120844 | | 10/2007 |
| WO | WO 2011041871 | | 4/2011 |

OTHER PUBLICATIONS

Revett, Kenneth; "Behavioral Biometrics A Remote Access Approach", pp. 171-185, 2008, John Wiley & Sons, Ltd., Harrow School of Computer Science, University of Westminster, UK—24 Pages.

Wang, et al.; "Behavioral Biometrics for Human Identification: Intelligent Applications"; pp. 207-203, 2010, Medical Information Science Reference, Hershey NY, Copyright 2010 by IGI Global; ISBN 978-1-60566-725-6 (hbk)—ISBN 978-1-60566-726-3 (ebook)—40 Pages.

Yampolskiy, Roman V. "Behavioral Modeling: an Overview", pp. 496-503, 2008, American Journal of Applied Sciences 5 (5), ISSN 1546-9239; © 2008 Science Publications, Center for Unified Biometrics and Sensors and Department of Computer Science and Engineering and IGERT in GIS, University at Buffalo, Buffalo, NY 14260, USA—8 Pages.

BioCatch; "Behavioural Biometrics in a PSD2 World", BioCatch Data Sheet, Copyright BioCatch 2018—2 Pages.

BioCatch; "Advanced Behavioral Biometrics with Biocatch", BioCatch Data Sheet, Copyright BioCatch 2020—2 Pages.

BioCatch; "Policy Manager", BioCatch Data Sheet, Copyright BioCatch 2020—2 Pages.

(56) References Cited

OTHER PUBLICATIONS

BioCatch; "BioCatch™ Analyst Station", BioCatch Data Sheet, Copyright BioCatch 2018—2 Pages.
Revett, Kenneth; "Behavioral Biometrics: A Remote Access Approach", pp. 1-4, 2008, Harrow School of Computer Science, University of Westminster, UK, A John Wiley and Sons, Ltd. Publication 2008—4 Pages.
Zhang, et al.; "Breaking Internet Banking CAPTCHA Based on Instance Learning", pp. 39-43, 2010 International Symposium on Computational Intelligence and Design, IEEE Computer Society, 978-0-7695-4198-3/10, DOI 10.1109/ISCID.2010.18, © 2010 IEEE, Date Retrieved: May 28, 2020—5 Pages.
Traore, Issa, et al., "Continuous Authentication Using Biometrics: Data, Models, and Metrics", pp. 1-66, 2012, ISBN 978-1-61350-129-0 (hardcover), ISBN 978-t-6 13S0-130-6 (ebook), TK7882.BS6C66 2012, Information Science Reference, IGI Global, Hershey, PA—80 Pages.
Solami, et al.; "Continuous Biometric Authentication: Can It Be More Practical?" pp. 647-652, 2010, DOI 10.1109/HPCC.2010.65, 12th IEEE International Conference on High Performance Computing and Communications, Information Security Institute, Queensland University of Technology, Queensland, Australia—6 Pages.
Reis, Charles et al. "Detecting In-Flight Page Changes with Web Tripwires", pp. 31-44, 2008, USENIX Association, NSDI '08:, 5th USENIX Symposium on Networked Systems Design USENIX Association and Implementation.
Der, Matthew F., "Detecting malicious JavaScript", Apr. 1, 2010, Honors Theses, Paper 168, Department of Mathematics & Computer Science, University of Richmond, Richmond, VA—37 Pages.
BioCatch; "From Login to Logout: Continuous Authentication with Behavioral Biometrics", Apr. 2018, BioCatch White Paper, Copyright BioCatch 2018—6 Pages.
Moskovitch, Robert et al. "Identity Theft, Computers and Behavioral Biometrics", pp. 156-160, Jun. 8-11, 2009 978-1-4244-4173-0/09, © 2009 IEEE, Richardson, TX, USA—6 Pages.
Sarma, Gunajit et al. "Internet Banking: Risk Analysis and Applicability of Biometric Technology for Authentication" pp. 67-78, Received: Nov. 17, 2010; Accepted: Mar. 12, 2010, Review Paper, Int. J. Pure Appl. Sci. Technol., 1(2), 2010, ISSN 2229—6107—12 Pages.
Janbandhu, P.K. et al. "Novel biometric digital signatures for Internet-based applications", pp. 205-212,Information Management & Computer Security, Sep. 5, 2001, MCB University Press, ISSN 0968-5227—8 Pages.
Ajufor, Nkem et al, "Refinement of a Mouse Movement Biometric System" pp. C1.1-C1.8, Proceedings of Student-Faculty Research Day, CSIS, Pace University, May 2, 2008, Seidenberg School of CSIS, Pace University, White Plains, NY, 10606, USA—8 Pages.
Lamacchia, Brian A. "Security Attacks and Defenses", pp. 1-23, Software Architect, Microsoft Corporation, 47th Meeting of IFIP WG 10.4, Jan. 29, 2005—23 Pages.
Pascual, Al et al. "The Role of Applicant Behavior Identity Proofing", pp. 1-22, Mar. 2018, Javelin Strategy & Research, a Greenwich Associates LLC company, © 2018 GA Javelin LLC.
Rybnik, Mariusz et al.; "User Authentication with Keystroke Dynamics using Fixed Text", pp. 70-75, 2009, International Conference on Biometrics and Kansei Engineering, 978-0-7695-3692-7/09, © 2009 IEEE, DOI 10.1109/ICBAKE.2009.42—6 Pages.
Wang, Weihang et al., "WebRanz: Web Page Randomization for Better Advertisement Delivery and Web-Bot Prevention", pp. 205-216, FSE'16, Nov. 13-18, 2016, Seattle, WA, USA, 2016 ACM. 978-1-4503-4218-6/16/11, http://dx.doi.org/10.1145/2950290.2950352—12 Pages.
H. Gamboa, A. L. N. Fred and A. K. Jain, "Webbiometrics: User Verification Via Web Interaction," 2007 Biometrics Symposium, 2007, pp. 1-6.
Balduzzi, et al., "A Solution for the Automated Detection of Clickjacking Attacks", ASIACCS'JO Apr. 13-16, 2010, Beijing, China.
Wells, J., Hutchinson, D., & Pierce, J. (2008). Enhanced Security for Preventing Man-in-the-Middle Attacks in Authentication, DataEntry and Transaction Verification.
Exhibit 682-A1. Invalidity Chart for U.S. Pat. No. 10,958,682 In View of Callanan.
Exhibit 682-A2—Invalidity Chart for U.S. Pat. No. 10,958,682 In View of O'Sullivan I.
Exhibit 682-A3—Invalidity Chart for U.S. Pat. No. 10,958,682 in View of O'Sullivan II.
Exhibit 682-A4—Invalidity Chart for U.S. Pat. No. 10,958,682 in View of O'Sullivan III.
Exhibit 682-A5—Invalidity Chart for U.S. Pat. No. 10,958,682 In View of Montgomery.
Exhibit 682-A6—Invalidity Chart for U.S. Pat. No. 10,958,682 In View of Willner I.
Exhibit 682-A7 Invalidity Chart for U.S. Pat. No. 10,958,682 In View of Wilner II.
Exhibit 682-A8—Invalidity Chart for U.S. Pat. No. 10,958,682 In View of Wilner III.
Exhibit 682-A9—Invalidity Chart for U.S. Pat. No. 10,958,682In View of WebBiometrics.
Exhibit 682-A10—Invalidity Chart for U.S. Pat. No. 10,958,682 In View of Lalonde.
Exhibit 682-B—Invalidity Chart for U.S. Pat. No. 10,958,682 Based on Obviousness References.
Exhibit 870-A1—Invalidity Chart for U.S. Pat. No. 9,122,870 In View of Callanan.
Exhibit 870-A2—Invalidity Chart for U.S. Pat. No. 9,122,870 In View of O'Sullivan I.
Exhibit 870-A3—Invalidity Chart for U.S. Pat. No. 9,122,870 In View of O'Sullivan II.
Exhibit 870-A4—Invalidity Chart for U.S. Pat. No. 9,122,870 In View of O'Sullivan III.
Exhibit 870-A5—Invalidity Chart for U.S. Pat. No. 9,122,870 In View of Montgomery.
Exhibit 870-A6—Invalidity Chart for U.S. Pat. No. 9,122,870 In View of Willner I.
Exhibit 870-A7—Invalidity Chart for U.S. Pat. No. 9,122,870 In View of Wilner II.
Exhibit 870-A8—Invalidity Chart for U.S. Pat. No. 9,122,870 In View of Willner III.
Exhibit 870-A9—Invalidity Chart for U.S. Pat. No. 9,122,870 In View of WebBiometrics.
Exhibit 870-A10—Invalidity Chart for U.S. Pat. No. 9,122,870 In View of Lalonde.
Exhibit 870-B—Invalidity Chart for U.S. Pat. No. 9,122,870 Based on Obviousness References.
Fast Hash Table Lookup Using Extended Bloom Filter: An Aid to Network Processing ("Song").
A Tutorial on CRC Computations ("Rambadran").
U.S.P.T.O, Before the Patent Trial and Appeal Board, *F5, Inc.*, v. *Sunstone Information Defense, Inc.*, Case IPR2022-00482 U.S. Pat. No. 9,122,870, Petition for Inter Partes Review of U.S. Pat. No. 9,122,870.
U.S.P.T.O, Before the Patent Trial and Appeal Board, *F5, Inc.*, v. *Sunstone Information Defense, Inc.*, Case IPR2022-00483, U.S. Pat. No. 10,230,759, Petition for Inter Partes Review of U.S. Pat. No. 10,230,759.
U.S.P.T.O, Before the Patent Trial and Appeal Board, *F5, Inc.*, v. *Sunstone Information Defense, Inc.*, Case IPR2022-00484, U.S. Pat. No. 10,958,682, Petition for Inter Partes Review of U.S. Pat. No. 10,958,682.
U.S.P.T.O, Before the Patent Trial and Appeal Board, *F5, Inc.*, v. *Sunstone Information Defense, Inc.*, Case IPR2022-00482 U.S. Pat. No. 9,122,870, Ex 1006, Declaration of Dr. Markus Jakobsson, Ph.D.
U.S.P.T.O, Before the Patent Trial and Appeal Board, *F5, Inc.*, v. *Sunstone Information Defense, Inc.*, Case IPR2022-00483, U.S. Pat. No. 10,230,759, Ex 1005, Declaration of Dr. Markus Jakobsson, Ph.D.

(56) References Cited

OTHER PUBLICATIONS

U.S.P.T.O, Before the Patent Trial and Appeal Board, *F5, Inc.*, v. *Sunstone Information Defense, Inc.*, Case IPR2022-00484, U.S. Pat. No. 10,958,682, Ex 1006, Declaration of Dr. Markus Jakobsson, Ph.D.
U.S.P.T.O, Before the Patent Trial and Appeal Board, *F5, Inc.*, v. *Sunstone Information Defense, Inc.*, Case IPR2022-00482 U.S. Pat. No. 9,122,870, Ex 1007, CV and Research Statement, Markus Jakobsson, (PTAB Case IPR2022-00483, Ex 1006; PTAB Case IPR2022-00484, Ex 1007).
U.S.P.T.O, Before the Patent Trial and Appeal Board, *F5, Inc.*, v. *Sunstone Information Defense, Inc.*, Case IPR2022-00482 U.S. Pat. No. 9,122,870, Ex 1008, U.S. Pat. No. 9,122,870 Patent History.
U.S.P.T.O, Before the Patent Trial and Appeal Board, *F5, Inc.*, v. *Sunstone Information Defense, Inc.*, Case IPR2022-00483, U.S. Pat. No. 10,230,759, Ex 1007, U.S. Pat. No. 10,230,759 Patent History.
U.S.P.T.O, Before the Patent Trial and Appeal Board, *F5, Inc.*, v. *Sunstone Information Defense, Inc.*, Case IPR2022-00484, U.S. Pat. No. 10,958,682, Ex 1008, U.S. Pat. No. 10,958,682 Patent History.
WebBiometrics: User Verification via Web Interaction ("Web-Biometrics").
Steven Myers et al., "Practice & prevention of home-router midstream injection attacks", Ecrime Researchers Summit, 2008, IEEE, Piscataway, NJ, USA, Oct. 15, 2008, pp. 1-14.
International Search Report and Written Opinion mailed Nov. 30, 2012 for International Application No. PCT/US2012/056363 filed on Sep. 20, 2012.

* cited by examiner

SilentBanker: Modified Webpage

SilentBanker: Modified Webpage

FIG. 10

Your Result:

Name: dave ford
password: ○○○○○
password: ○○○○○
Submit

1004

Edit and Click Me >>

```
<html>
<body>
<form action="form_action.asp" method="get">
Name: <input type="text" name="fullname" /><br />
password: <input type="password"
    STYLE="color: #FFFFFF;
    font-family: Verdana;
    font-weight: bold;
    font-size: 12px;
    background-color: #72A4D2;"
    size="11"
    maxlength="30"/><br />
password: <input type="password"
    STYLE="color: #FFFFFF;
    font-family: Verdana;
    font-weight: bold;
    font-size: 14px;
    background-color: #72A4D2;"
    size="10"
    maxlength="30"/><br />
<input type="submit" value="Submit" />
</form>
<body>
<html>
```

1002

1000

METHODS AND APPARATUS FOR DETECTING A PRESENCE OF A MALICIOUS APPLICATION

PRIORITY CLAIM

The present application is a continuation of, claims priority to and the benefit of U.S. patent application Ser. No. 17/699,820, filed on Mar. 21, 2022, now U.S. Pat. No. 11,943,255, which claims priority to and the benefit as a continuation application of U.S. patent application Ser. No. 17/208,783, filed on Mar. 22, 2021, now U.S. Pat. No. 11,283,833, which claims priority to and the benefit as a continuation application of U.S. patent application Ser. No. 16/298,537, filed on Mar. 11, 2019, now U.S. Pat. No. 10,958,682, which claims priority to and the benefit as a continuation application of U.S. patent application Ser. No. 14/841,083, filed on Aug. 31, 2015, now U.S. Pat. No. 10,230,759, which claims priority to and the benefit as a continuation application of U.S. patent application Ser. No. 13/623,556, now U.S. Pat. No. 9,122,870, filed on Sep. 20, 2012, which claims priority to and the benefit of the following provisional patent applications: U.S. Provisional Patent Application Ser. No. 61/557,733, filed on Nov. 9, 2011, and U.S. Provisional Patent Application Ser. No. 61/537,380, filed on Sep. 21, 2011, the entirety of which are incorporated herein by reference.

BACKGROUND

Traditional communication systems address certain reliability and performance issues that arise during the transfer of information from a sender to a receiver through a medium. In an idealized situation, no errors are introduced as the information travels through the medium. As a result, the receiver obtains, with 100% fidelity, a message identical to the one transmitted into the medium by the sender.

In actual practice however, the medium is not error free. Environmental factors typically contribute haphazard information in the medium. This haphazard information is commonly referred to as "noise". This noise can result from, for example, shot noise, neighboring radio frequencies, undesirable voltage and/or current fluctuations in circuit components, signal reflections from trees/buildings, solar flares, etc.

In information warfare, there exists a related concept of signal jamming. The idea is to increase the contribution of the noise to such an extent that it becomes practically impossible to find a set of codewords that are simultaneously robust and efficient. This type of noise is not haphazard but rather specifically crafted to render a specific medium too noisy to use. The targets of this type of purposefully crafted noise are unable to communicate.

An important purpose of traditional communication systems are to characterize a noise source and to create a set of primary codewords that are robust against that noise type. The primary codewords are designed to be efficient for communication of a wide variety of often used messages. As provided by traditional communication systems, the transmission of information through the Internet occurs over a variety of medium including cable, wireless, satellite, etc. Currently, traditional communication systems play a significant role in engineering and assuring the reliability and efficiency of those transmissions against a variety of haphazard noise sources.

Traditional communication systems have reduced the effects of haphazard noise in the communication medium as well at the sender and the receiver. For example, the sender or the receiver can include circuitry to reduce or eliminate the effects of haphazard noise. Additionally, routing devices in the medium, the sender, and the receiver can also use quality of service, data integrity, and/or error correction functions to correct for haphazard noise. These functions can be associated with, for example, network cards and associated stacks as received packets are queued and recombined into a complete data stream.

In addition to haphazard noise, there also exists engineered malicious noise specifically created to affect, alter, or otherwise interfere with communications between a sender and a receiver. This malicious noise is an injected signal that alters codewords sent between senders and receivers in a manner that is generally not correctable by existing error correction methods of traditional communication systems. The malicious noise, created by malicious applications, are directed to interfere with communications anywhere along a communication channel through the Internet from a sender to a receiver including routers, switches, repeaters, firewalls, etc.

The malicious applications are configured to identify codeword sets and provide malicious noise that effectively switches one valid codeword for a second valid codeword. Traditional error correction schemes cannot detect this switch because they have no way of identifying that an error has occurred. The resulting altered signal is a viewed as a valid codeword from the point of view of the traditional communication system. Other types of noise that commonly occur in information warfare are also deliberate and engineered (e.g. signal jamming) but the phenomena does not result in a useable codeword set.

Unlike environmentally derived haphazard noise, this malicious noise does not consist of haphazard content, nor does it disallow effective communication as a jamming signal might. Instead, this noise is specifically crafted to substitute the originally transmitted message for a second, specific, legitimate, and understandable message which is then presented to a receiver as authentic intent of the sender. The crafted noise may also occur before selected information leaves a sender (e.g., a server, database and/or directory structure) for transmission to a receiver. This crafted noise is referred to herein as malicious noise. The crafter of the malicious noise of referred to here in as a malicious application.

Using malicious noise, viruses and other types of malicious applications are able to direct a client device (e.g., a receiver) to perform actions that a communicatively coupled server (e.g., a sender) did not originally intend. Additionally, the viruses and malicious applications are able to direct a server to perform actions that communicatively coupled client devices did not originally intend. Conventional virus detection algorithms often fail to detect the malicious nature of the noise because these algorithms are configured to detect the presence of the noise's source rather than the noise itself. The noise generation algorithm (e.g., the code of the malicious application) is relatively easily disguised and able to assume a wide variety of formats. There is accordingly a need to validate communications between servers and client devices in the presence of malicious noise.

SUMMARY

The present disclosure provides a new and innovative system, methods, and apparatus for validating communications in an open architecture system. A security processor uses variations of soft information to specify how hard information managed by a server is to be displayed on a communicatively coupled client device. The security processor creates a prediction as to how the client device will render the hard information based on the variation of the selected soft information. The security processor then compares information in a response from the client device to the prediction to determine if a malicious application has affected or otherwise altered communications between the server and the client device.

In an example embodiment, a method for validating communications includes selecting hard information to transmit from a server to a communicatively coupled client device based on a request from the client device and selecting soft information corresponding to the hard information to transmit from the server to the client device. The example method also includes transmitting at least one message including the soft and hard information from the server to the client device and determining a prediction as to how the client device will render the hard information based on the soft information. The example method further includes receiving a response message from the client and responsive to information in the response message not matching the prediction, providing an indication there is a malicious application affecting communications between the server and the client device.

Additional features and advantages of the disclosed system, methods, and apparatus are described in, and will be apparent from, the following Detailed Description and the Figures.

BRIEF DESCRIPTION OF THE FIGURES

FIG. 10 shows a diagram of a datagram that includes an example of coded soft information selected by a security processor.

DETAILED DESCRIPTION

Figure 1:
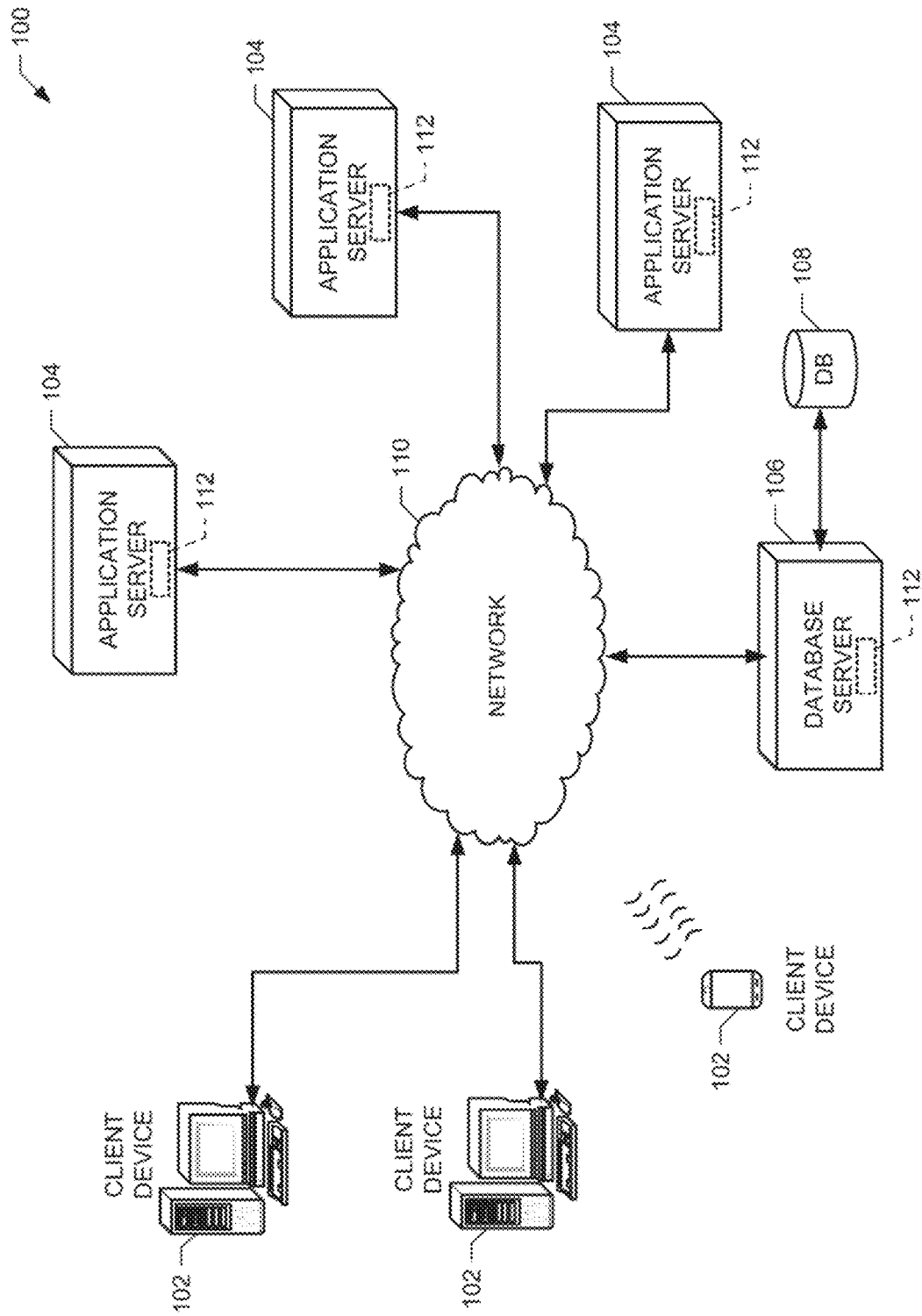
FIG. 1 is a block diagram of an example network communicating system, according to an example embodiment of the present invention.

The present disclosure relates in general to a method, apparatus, and system to validate communications in an open architecture system and, in particular, to predicting responses of client device to identify malicious applications attempting to interfere with communications between servers and the client devices.

Briefly, in an example embodiment, a system is provided that detects malicious errors in a communication channel between a server and a client device. Normally, communication errors between a server and a client device are a result of random channel noise. For instance, communications received by server-client endpoints fall outside of a set of prior selected, recognizable, messages or codewords. Channel errors are usually corrected by existing error correction schemes and internet protocols. The end user is typically unaware that a transmission error has occurred and has been corrected.

Malicious applications typically evade error correcting schemes in two ways: first by altering an original message into an alternative message, and second by creating noise in a segment of a channel where traditional error correction schemes do not operate. In the first way, a malicious application alters an original message into an alternative message that is already in a codeword set of an error correction mechanism. The malicious application may also provide additional messages that are included within the codeword set. As a result, an error correction algorithm is unaware that an error has even taken place and thereby makes no attempt to correct for the error.

In the second way, a malicious application creates noise in a segment of a channel where traditional error correction schemes do not operate. For example, once a packet successfully traverses the Internet and arrives at a network interface of a receiving device, a bit stream of the packet is processed by an application stack under an assumption that no further transmission noise sources will occur. As a result, the application stack does not anticipate errors to occur in the bit stream after processing and thereby makes no attempt to correct for any errors from this channel noise.

Malicious applications create targeted malicious noise configured to interfere with communications between a client device and a server. This channel noise is guided by a deliberate purpose of the malicious application to alter, access, or hijack data and/or content that is being communicated across a client-server connection. Oftentimes, the noise alters communications from original and authentic information to substitute authentic-appearing information. The noise is often induced in a segment of the (extended) channel that is poorly defended or entirely undefended by error correction algorithms. As a result, a malicious application is able to use channel noise to direct a server and/or a client device to perform actions that the client device or server did not originally intend.

In an example, a client device may be connected to an application server configured to facilitate banking transactions. During a transaction, the server requests the client device to provide authentication information (e.g., a username and a password) to access an account. A malicious application detects the connection and inserts malicious noise that causes the client device to display a security question in addition to the username and password prompts (e.g., client baiting). A user of the client, believing the server provided the security question, enters the answer to the security question with the username and password. The malicious application monitors the response from the client device so as to use malicious noise to remove the answer to the security question before the response reaches the server. The malicious application may then use the newly acquired security question to later illegally access the account associated with the client device to improperly withdrawal funds.

In this example, the server is unable to detect the presence of the malicious application because the server receives a proper response to the authentication, namely the username and password. The client device also cannot detect the malicious application because the client device believes the server provided the security question. As a result, the malicious application is able to use channel noise to acquire sensitive information from the client device without being detected by the server or the client.

This client baiting is not the only method used by malicious applications. In other examples, malicious applications may use channel noise to add data transactions between a client device and a server (e.g., add banking transactions). For instance, a client device may specify three bill payment transactions and a malicious application may insert a fourth transaction. In further examples, malicious applications may use channel noise to remove, substitute, or acquire data transmitted between a server and a client, modify data flow between a server and a client, inject graphics or advertisements into webpages, add data fields to forms, or impersonate a client device or a server.

The example method, apparatus, and system disclosed herein overcome at least some of these issues caused by malicious noise by detecting malicious applications through estimated, predicted, or anticipated responses from a client device. The example method, apparatus, and system disclosed herein detect malicious applications by varying soft information describing how hard information is to be displayed by a client device. During any client-server connection, a server provides hard information and soft information. The hard information includes data, text, and other information that is important for carrying out a transaction with a client. The soft information specifies how the hard information is to be rendered and displayed by the client device.

A server uses hard and soft messaging to transmit the hard and soft information to a client device. In some instances, the soft and hard information can be combined into messages before transmission. In other examples, the soft and hard information can be transmitted to a client device in separate messages. As used herein, soft messaging refers to the transmission of soft information to a client device in separate or combined soft/hard messages and hard messaging refers to the transmission of hard information to a client device in separate or combined soft/hard messages.

The example method, apparatus, and system disclosed herein use variations in soft information to form a best guess (e.g., a prediction or estimation) as to how hard information is displayed by a client device. The example method, apparatus, and system disclosed herein then compare a response from the client device to the best guess. If the information included within the response does not match or is not close enough to the prediction, the example method, apparatus, and system disclosed herein determine that a malicious application is affecting communications between a server and a client or, alternatively, provide an indication that a malicious application is affecting communications. As a result of this detection, the example method, apparatus, and system disclosed herein implement fail safe procedures to reduce the effects of the malicious application.

The example method, apparatus, and system disclosed herein uses soft information and messaging as a signaling language to detect malicious applications. In other words, the example method, apparatus, and system disclosed herein create an extended set of codewords for use with a user of a client device to validate that a malicious application is not interfering with communications. The created codeword set installs or uses soft messaging techniques including dynamically linked and/or static libraries, frameworks, browser helper objects, protocol filters, etc. The goal of these soft messaging techniques is to perturb the created communication channel such that the soft information cannot be reverse engineered by the malicious application but is known by the client device and the server.

Figure 17:
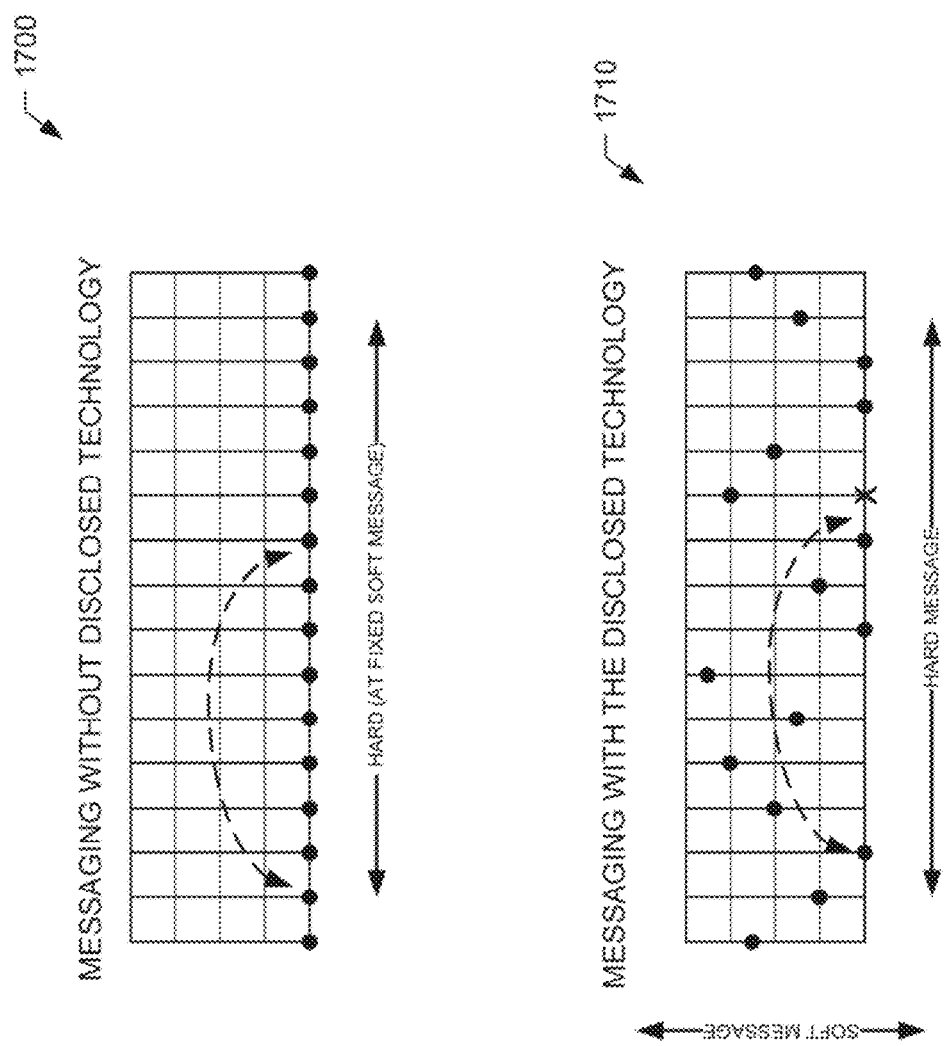
FIG. 17 shows diagrams comparing messaging without using an example embodiment of the present invention and messaging using an example embodiment of the present invention.

For instance, FIG. 17 shows diagrams comparing messaging without the example method, apparatus, and system disclosed herein and messaging using the example method, apparatus, and system disclosed herein. Diagram 1700 shows that in the absence of the example method, apparatus, and system disclosed herein, a set of legitimate codewords (denoted by circles) is fixed. Malicious applications know how these codewords are fixed and use malicious noise (denoted by the arrow) to transform a first valid codeword into a second valid codeword. The transformation is undetected by a receiving client device and the sending server.

In contrast, diagram 1710 shows that the example method, apparatus, and system disclosed herein uses variability in soft information and messaging extends the dimensionality of the codeword set. This variability is unknown by the malicious application. Thus, an error occurs when the malicious noise combines with an intended codeword. As shown in diagram 1710, the resulting altered codeword (denoted by an "X") does not match the set of anticipated recognized codewords, which enables the malicious noise to be detected. The example method, apparatus, and system disclosed herein are accordingly able to use this soft information and messaging variability to detect malicious noise.

As used herein, hard messaging and hard information is transactional text and/or data displayed by a client device. The transactional text, data, pictures, and/or images that can be instructional, informational, functional, etc. in nature. The hard information also includes textual options that are selectable by a client. Hard information is accordingly principal information of a transaction or service provided by a server and presented to a client by a client device.

The hard information includes any type of text and/or data needed by a server to perform a transaction or service on behalf of a client. For instance, hard information of a webpage of an account log-in screen includes text providing instructions to a client as to the nature of the webpage, text for a username field, and text for a password field. After a client has logged into the account, the hard information includes transaction numbers, transaction dates, transaction details, an account balance, and account identifying information. Hard information may be financial (e.g. on-line banking), material (e.g., flow control of raw material in manufacturing processes), or related to data management (e.g., encryption, decryption, addition to or removal from shared storage, copying, deletion, etc.).

As used herein, soft messaging and soft information is presentation information describing how hard information is to be displayed by a client device. Soft information pertains to the installation and/or system usage of dynamically linked and/or static libraries, frameworks, browser helper objects, protocol filters, javascript, plug-ins, etc. that are used to display hard information without interrupting the communication of the hard portion of the message between a client device and a server. The soft portion of the message includes information based on a server's selection of protocol, formatting, positioning, encoding, presentation, and style of a fully rendered version of hard information to be displayed at the client device endpoint. The soft information can also include preferences (e.g., character sets, language, font size, etc.) of clients as to how hard information is to be displayed. The precise details of the manner or method in which the direct, client device initiated, response information returns to the server is also a soft component of the communication and may be varied or manipulated without detracting from an ability of the server and client device to conduct e-business, e-banking, etc.

The hard part of the message is constrained, for example, by business utility (e.g., there must be a mechanism for a client device to enter intended account and transaction information and return it to the server) while the soft part of the message has fewer constraints. For example, the order in which a client device enters an account number and a transaction amount usually is not important to the overall transaction. To achieve the business purpose a server only has to receive both pieces of information.

In the client baiting example described above, the example method, apparatus, and system disclosed herein cause the server to transmit to the client device in one or more soft messages code that causes the client device to return coordinates of a mouse click of a 'submit' button. These soft messages are included with the other soft messages describing how the authentication information is to be displayed by the client. The server also determines a prediction as to what the coordinates should be based on knowing how the particular client device will render and display the information.

When the malicious application uses malicious noise to insert the security question, the malicious application has to move the 'submit' button lower on a webpage. Otherwise, the security question would appear out of place on the webpage in relation to the username and password fields. When a user of the client device uses a mouse to select the 'submit' button, the client device transmits the coordinates of the mouse click to the server. The server compares the received coordinates with the coordinates of the prediction and determines that the difference is greater than a standard deviation threshold, which indicates the presence of a malicious application. In response to detecting the malicious application, the server can initiate fail safe procedures to remedy the situation including, for example, requiring the client device to create new authentication information or restricting access to the account associated with the client device.

As can be appreciated from this example, the example method, apparatus, and system disclosed herein provide server-client communication channel validation. By knowing how a client device is to display information, the example method, apparatus, and system disclosed herein enable a server to identify remotely located malicious applications that mask their activities in hard to detect channel noise. As a result, servers are able to safeguard client data and transactions from some of the hardest to detect forms of malicious third party methods to acquire information and credentials. This allows service providers that use the example method, apparatus, and system disclosed herein to provide security assurances to customers and other users of their systems.

Throughout the disclosure, reference is made to malicious applications (e.g., malware), which can include any computer virus, counterfeit hardware component, unauthorized third party access, computer worm, Trojan horse, rootkit, spyware, adware, or any other malicious or unwanted software that interferes with communications between client devices and servers. Malicious applications can interfere with communications of a live session between a server and a client device by, for example, acquiring credentials from a client device or server, using a client device to instruct the server to move resources (e.g., money) to a location associated with the malicious application, injecting information into a form, injecting information into a webpage, capturing data displayed to a client, manipulating data flow between a client device and a server, or impersonating a client device using stolen credentials to acquire client device resources.

Additionally, throughout the disclosure, reference is made to client devices, which can include any cellphone, smartphone, personal digital assistant ("PDA"), mobile device, tablet computer, computer, laptop, server, processor, console, gaming system, multimedia receiver, or any other computing device. While this disclosure refers to connection between a single client device and a server, the example method, apparatus, and system disclosed herein can be applied to multiple client devices connected to one or more servers.

Examples in this disclosure describe client devices and servers performing banking transactions. However, the example method, apparatus, and system disclosed herein can be applied to any type of transaction or controlled usage of resources between a server and a client device including, but not limited to, online purchases of goods or services, point of sale purchases of goods or services (e.g., using Near Field Communication), medical applications (e.g., intravenous medication as dispensed by an infusion pump under the control of a computer at a nurses station or medication as delivered to a home address specified in a webpage), manufacturing processes (e.g., remote manufacturing monitoring and control), infrastructure components (e.g., monitoring and control of the flow of electricity, oil, or flow of information in data networks), transmission of information with a social network, or transmission of sensitive and confidential information.

The present system may be readily realized in a network communications system. A high level block diagram of an example network communications system 100 is illustrated in FIG. 1. The illustrated system 100 includes one or more client devices 102, one or more application servers 104, and one or more database servers 106 connected to one or more databases 108. Each of these devices may communicate with each other via a connection to one or more communication channels in a network 110. The network 110 can include, for example the Internet or some other data network, including, but not limited to, any suitable wide area network or local area network. It should be appreciated that any of the devices described herein may be directly connected to each other and/or connected through the network 110. The network 110 may also support wireless communication with wireless client devices 102.

The client devices 102 access data, services, media content, and any other type of information located on the servers 104 and 106. The client devices 102 may include any type of operating system and perform any function capable of being performed by a processor. For instance, the client devices 102 may access, read, and/or write information corresponding to services hosted by the servers 104 and 106.

Typically, servers 104 and 106 process one or more of a plurality of files, programs, data structures, databases, and/or web pages in one or more memories for use by the client devices 102, and/or other servers 104 and 106. The application servers 104 may provide services accessible to the client devices 102 while the database servers 106 provide a framework for the client devices 102 to access data stored in the database 108. The servers 104 and 106 may be configured according to their particular operating system, applications, memory, hardware, etc., and may provide various options for managing the execution of the programs and applications, as well as various administrative tasks. A server 104, 106 may interact via one or more networks with one or more other servers 104 and 106, which may be operated independently.

The example servers 104 and 106 provide data and services to the client devices 102. The servers 104 and 106 may be managed by one or more service providers, which control the information and types of services offered. These services providers also determine qualifications as to which client devices 102 are authorized to access the servers 104 and 106. The servers 104 and 106 can provide, for example, banking services, online retain services, social media content, multimedia services, government services, educational services, etc.

Additionally, the servers 104 and 106 may provide control to processes within a facility, such as a process control system. In these instances, the servers 104 and 106 provide the client devices 102 access to read, write, or subscribe to data and information associated with specific processes. For example, the application servers 104 may provide information and control to the client devices 102 for an oil refinery or a manufacturing plant. In this example, a user of the client device 102 can access an application server 104 to view statuses of equipment within the plant or to set controls for the equipment within the plant.

While the servers 104 and 106 are shown as individual entities, each server 104 and 106 may be partitioned or distributed within a network. For instance, each server 104 and 106 may be implemented within a cloud computing network with different processes and data stored at different servers or processors. Additionally, multiple servers or processors located at different geographic locations may be grouped together as server 104 and 106. In this instance, network routers determine which client device 102 connects to which processor within the application server 104.

In the illustrated example of FIG. 1, each of the servers 104 and 106 includes a security processor 112. The security processor 112 monitors communications between the client devices 102 and the respective servers 104 and 106 for suspicious activity. The monitoring may include detecting errors in a communication channel between a client device 102 and a server 104 using hard and soft messages, as described herein.

In some embodiments, the security processor 112 may be configured to only detect channel errors that are of strategic importance. This is because malicious applications generally only target communications that convey high value information (e.g., banking information). As a result, using the security processor 112 for important communications helps reduce processing so that the security processor 112 does not validate communications that are relatively insignificant (e.g., browsing a webpage). These important communications can include authentication information, refinements to types of requested services, or details on desired allocation of resources under a client's control. These resources may be financial (e.g., on-line banking), material (e.g., flow control of raw material in manufacturing processes) or related to data management (e.g., encryption, decryption, addition to or removal from shared storage, copying, deletion, etc.).

In an example embodiment, a client device 102 requests to access data or servers hosted by a server 104. In response, the server 104 determines hard information that corresponds to the request and identifies soft information compatible with the hard information. In some instances, the server 104 may use device characteristics or information of the client device 102 to select the soft messaging. Upon selecting the soft and hard messages, the security processor 112 selects how the messages are combined into transmission packets and instructs the server 104 to transmit the packets to the client device 102. To make the packets undecipherable by malicious applications, the security processor 112 may combine hard and soft information, rearrange the order of information transmission, or mix different layers of information.

The unperturbed location of any input boxes or buttons selected by the security processor 112 for soft messaging may vary, subtly, from session to session, without being observable by a client device 102 or a malicious application. For example, the absolute and relative positioning of page elements may be obscured by the incorporation of operating system, browser, and bugz and further obscured by seemingly routine use of byte code and javascript. The security processor 112 may also use redundant measures for determining rendered page geometry and activity so that information returned from the client device 102 may be further verified. For instance, benign "pop-up windows" featuring yes/no button messages such as: "would you have time to take our brief customer survey?" may be made to appear or not appear depending on actual cursor or mouse locations when a 'submit' button is pressed at the client device 102. Additionally, the security processor 112 may use generic geometrical and content related soft-variations (absolute and relative locations of input boxes and buttons, the appearance or lack of appearance of benign "pop-up" boxes, buttons, advertisements or images) to validate communications with a client device 102. In other words, the security processor 112 may use soft information provided by client devices 102 to also validate a communication channel.

After selecting which soft and hard information to send to the client device 102, the security processor 112 makes a prediction, in this example, as to a location of a 'Submit' icon on a fully rendered webpage displayed on client device 102. This icon is part of a banking website provided by application server 104. The security processor 112 may also use backscattered information received from routing components in the network 110 to form the prediction. This backscattered information provides, for example, how the soft and hard information in the transmitted message(s) are processed, routed, and rendered.

The security processor 112 then monitors a response by the client device 102 to identify coordinates of a mouse click of the 'Submit' icon. The security processor 112 determines that a malicious application is affecting communications if the prediction does not match the reported coordinates of the mouse clink on the icon. In response to detecting a malicious application, the security processor 112 attempts to prevent the malicious application from further affecting communications with the affected client devices 102. In some embodiments, the security processor instructs the servers 104 and 106 to alter normal operation and enter into a safe operations mode. In other embodiments, the security processor 112 restricts activities of the affected client devices 102 or requests the client devices 102 to re-authenticate or establish a more secure connection. The security processor 112 may also store a record of the incident for processing and analysis. In further embodiments, the security processor 112 may transmit an alert and/or an alarm to the affected client devices 102, personnel associated with the servers 104 and 106, and/or operators of the security processor 112.

While each server 104 and 106 is shown as including a security processor 112, in other embodiments the security processor 112 may be remotely located from the servers 104 and 106 (e.g., the security processor 112 may be cloud-based). In these embodiments, the security processor 112 is communicatively coupled to the servers 104 and 106 and remotely monitors for suspicious activity of malicious applications. For instance, the security processor 112 may provide soft information to the servers 104 and 106. The security processor 112 may also receive client device response messages from the servers 104 and 106. In instances when the security processor 112 detects a malicious application, the security processor 112 remotely instructs the servers 104 and 106 how to remedy the situation.

Figure 2:
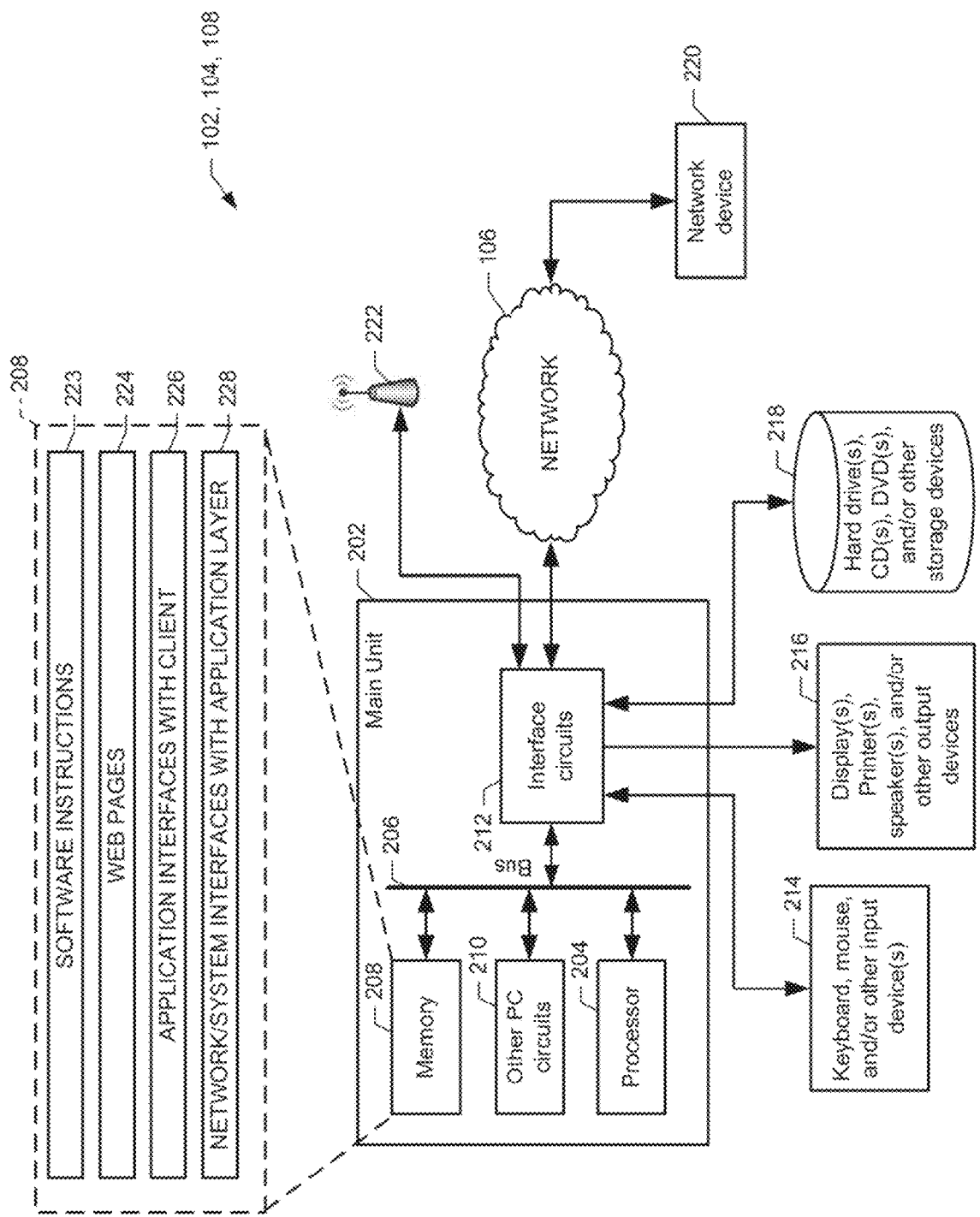
FIG. 2 is a detailed block diagram showing an example of a client device, application server, or database server according to an example embodiment of the present invention.

A detailed block diagram of electrical systems of an example computing device (e.g., a client device 102, an application server 104, or a database server 106) is illustrated in FIG. 2. In this example, the computing device 102, 104, 106 includes a main unit 202 which preferably includes one or more processors 204 communicatively coupled by an address/data bus 206 to one or more memory devices 208, other computer circuitry 210, and one or more interface circuits 212. The processor 204 may be any suitable processor, such as a microprocessor from the INTEL PENTIUM® or CORE™ family of microprocessors. The memory 208 preferably includes volatile memory and non-volatile memory. Preferably, the memory 208 stores a software program that interacts with the other devices in the system 100, as described below. This program may be executed by the processor 204 in any suitable manner. In an example embodiment, memory 208 may be part of a "cloud" such that cloud computing may be utilized by computing devices 102, 104, 106. The memory 208 may also store digital data indicative of documents, files, programs, web pages, etc. retrieved from computing device 102, 104, 106 and/or loaded via an input device 214.

The example memory devices 208 store software instructions 223, webpages 224, user interface features, permissions, protocols, configurations, and/or preference information 226. The memory devices 208 also may store network or system interface features, permissions, protocols, configuration, and/or preference information 228 for use by the computing devices 102, 104, 106. It will be appreciated that many other data fields and records may be stored in the memory device 208 to facilitate implementation of the methods and apparatus disclosed herein. In addition, it will be appreciated that any type of suitable data structure (e.g., a flat file data structure, a relational database, a tree data structure, etc.) may be used to facilitate implementation of the methods and apparatus disclosed herein.

The interface circuit 212 may be implemented using any suitable interface standard, such as an Ethernet interface and/or a Universal Serial Bus (USB) interface. One or more input devices 214 may be connected to the interface circuit 212 for entering data and commands into the main unit 202. For example, the input device 214 may be a keyboard, mouse, touch screen, track pad, track ball, isopoint, image sensor, character recognition, barcode scanner, microphone, and/or a speech or voice recognition system.

One or more displays, printers, speakers, and/or other output devices 216 may also be connected to the main unit 202 via the interface circuit 212. The display may be a cathode ray tube (CRTs), a liquid crystal display (LCD), or any other type of display. The display generates visual displays generated during operation of the computing device 102, 104, 106. For example, the display may provide a user interface and may display one or more webpages received from a computing device 102, 104, 106. A user interface may include prompts for human input from a user of a client device device 102 including links, buttons, tabs, checkboxes, thumbnails, text fields, drop down boxes, etc., and may provide various outputs in response to the user inputs, such as text, still images, videos, audio, and animations.

One or more storage devices 218 may also be connected to the main unit 202 via the interface circuit 212. For example, a hard drive, CD drive, DVD drive, and/or other storage devices may be connected to the main unit 202. The storage devices 218 may store any type of data, such as pricing data, transaction data, operations data, inventory data, commission data, manufacturing data, marketing data, distribution data, consumer data, mapping data, image data, video data, audio data, tagging data, historical access or usage data, statistical data, security data, etc., which may be used by the computing device 102, 104, 106.

The computing device 102, 104, 106 may also exchange data with other network devices 220 via a connection to the network 110 or a wireless transceiver 222 connected to the network 110. Network devices 220 may include one or more servers (e.g., the application servers 104 or the database servers 106), which may be used to store certain types of data, and particularly large volumes of data which may be stored in one or more data repository. A server may include any kind of data including databases, programs, files, libraries, pricing data, transaction data, operations data, inventory data, commission data, manufacturing data, marketing data, distribution data, consumer data, mapping data, configuration data, index or tagging data, historical access or usage data, statistical data, security data, etc. A server may store and operate various applications relating to receiving, transmitting, processing, and storing the large volumes of data. It should be appreciated that various configurations of one or more servers may be used to support and maintain the system 100. For example, servers may be operated by various different entities, including sellers, retailers, manufacturers, distributors, service providers, marketers, information services, etc. Also, certain data may be stored in a client device device 102 which is also stored on a server, either temporarily or permanently, for example in memory 208 or storage device 218. The network connection may be any type of network connection, such as an Ethernet connection, digital subscriber line (DSL), telephone line, coaxial cable, wireless connection, etc.

Access to a computing device 102, 104, 106 can be controlled by appropriate security software or security measures. An individual users' access can be defined by the computing device 102, 104, 106 and limited to certain data and/or actions. Accordingly, users of the system 100 may be required to register with one or more computing devices 102, 104, 106.

The Client-Server Communication Channel

Figure 3:
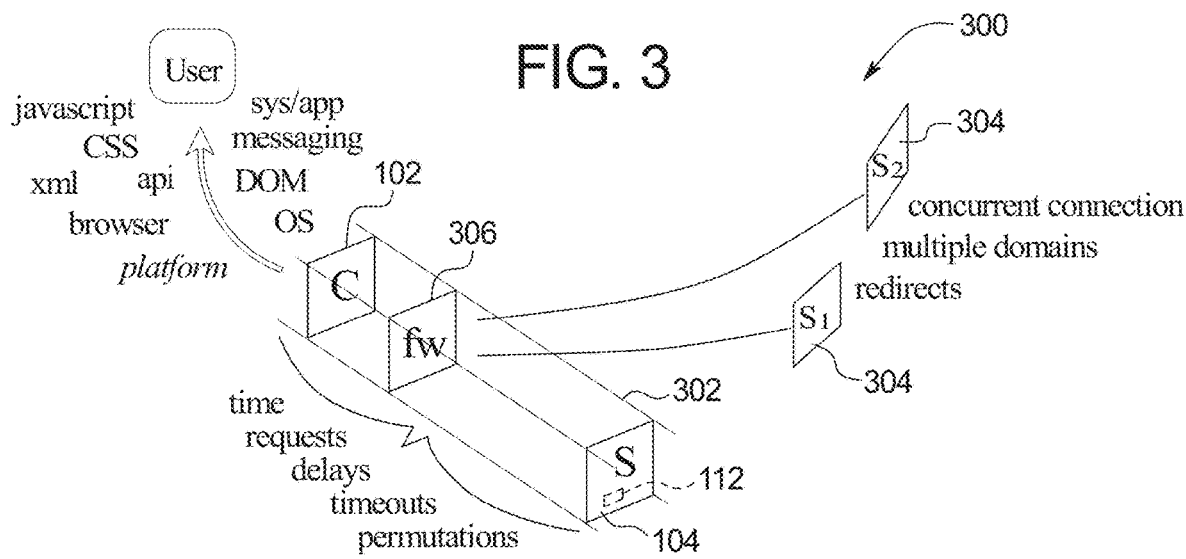
FIG. 3 is a diagram of a communication session between a client device and an application server.

FIG. 3 shows a diagram of a communication session 300 between a client device 102 and an application server 104.

The communication session 300 occurs over a communication channel 302, which is included in the network 110 of FIG. 1. The communication channel 302 includes hardware and software components that convey, relay, shape and forward information between the server 104 and the client device 102. The hardware components includes network node devices such as routers, mobile switching center components, base switching center components, data storage, caches, device proxies and firewalls. The hardware components can also include client device specific endpoints, computer architecture, processor types, mobile device chipsets, SIM cards and memory. The software components of the channel include network or endpoint device platforms, instruction sets, operating systems, operating system versions, application programming interfaces ("api"), and libraries. The software components can also include client device endpoint software, user interfaces, browser types, browser versions, cascading style sheets, scripts, document object models, javacode, byte script, etc.

In the communication channel 302, information transmitted by the server 104 (e.g., soft/hard information included within soft/hard messages) is acted upon, processed, forwarded, and rendered by the various intervening hardware and software channel components. The processing is performed by hardware and software components residing on both network and client device endpoints. The client device 102 is the ultimate recipient of the fully realized, completely processed version of the information transmitted by the server 104. The client device 102 is stimulated by the received (processed) information into prompting a user for decision(s) and/or performing one or more actions. Once a user inputs a decision, the client device 102 communicates a response message to the server 104 through the channel 302.

While FIG. 3 shows one communication channel 302, other communication channels can include different components and corresponding behavioral characteristics that vary from one server-client device connection to another. The behavioral characteristics identify ways in which information is acted upon, processed, forwarded and rendered by the hardware and software components of the channel 302. The security processor 112 uses these behavioral characteristics to help form a prediction of a response from the client device 102.

Once a server-client device connection is established across a channel 302 and the primary, intended function of that communication is initiated (e.g., the type of transaction that is to occur across the channel 302), secondary characteristics and observables are generated in the channel 302 as a consequence. There are two types of secondary characteristics and observables: "global" (involving many or all channel components) and "local" (involving a single, pair, or triple of channel components).

The "global" channel's temporal secondary characteristics are applied across many or all hardware/software components and layers in, for example, the network 110 and include: i) number and size of discrete transmissions, ii) density of discrete transmissions, iii) frequency and other spectral content (e.g., content obtained by discrete Fourier transform, wavelet transform, etc. of an observed time series), and iv) geo-spatial density. These characteristics are derived from observables (e.g., from observation of information flow between client device 102 and server 104) that include, for example, i) delivery times, ii) delivery rates, iii) transmission requests (as reports on errors or inefficiencies), and iv) sequencing or permutations in an order of information processing events. These observables are dependent on a number of factors including, for example, hardware type, software type, and current state (e.g., traffic load, internal queue lengths, etc.) of components that comprise the channel 302.

"Local" observables may also be generated on a per client device basis or per layer basis in the channel 302 of FIG. 3 by server 104 and/or client device 102 initiated stimuli. The variations between client devices or layers are a result of a client's or layer's internal, device specific, information processing prioritization rulesets/protocols, inter-component signaling rulesets, and/or protocols that use hardware or software-based signaling components. The local observables may indicate, for example, a browser type used by the client device 102, an operating system of the client device 102, or device coding schemes used by the client device 102.

In the example embodiment of FIG. 3, the security processor 112 structures the hard and soft messaging output by the server 104 so that the secondary characteristics and observables function as a secondary means of communication between the client device 102 and server 104. At the same time, the security processor 112 structures the hard and soft messaging output by the server 104 in a manner consistent with the original purpose of the connection with the client device 102. As a result, the secondary means of communication between the server 104 and the client device 104 over the channel 302 is configured to not interfere with the primary, intended function of the server-client device interaction. As a result, the security processor 112 uses the channel 302 to vary soft information without changing the nature of the intended transaction between the server 104 and the client device 102.

In FIG. 3, the channel 302 is constructed for universal use (e.g., an open architecture channel). That is, the component and collections of component technologies of the channel 302 are designed to enable a rich variety of server types, client device types, and purposeful communications between the different server and client device types. This enables the security processor 112 to use a variety of different soft messaging methods to achieve the original, intended purpose of the server-client transaction. However, each soft messaging method sets into motion a different set of (global and local) channel characteristic signals and observables. The security processor 112 is accordingly able to establish a secondary communication language between the server 104 and the client device 102 across the channel 302 using the association between variations in soft messaging methods (global, local) and corresponding channel characteristic responses.

The communication session 300 of FIG. 3 also includes malicious applications 304, which are configured to interfere with client-server communications while allowing the primary, intended function of the server-client device interaction to occur. However in accomplishing and creating this perturbation of the primary, intended communication between the server 104 and the client device 102, the malicious applications 304 effectively become an "additional component" of the channel 302, thereby unknowingly affecting the secondary communications. As shown in FIG. 3, the malicious applications 304 can insert information into the channel 302 and/or extract information from the channel 302 using engineered channel noise. The example security processor 112 detects these malicious applications 304 by monitoring how generated malicious channel noise impacts the consistently crafted client-server secondary communications.

Figure 4:
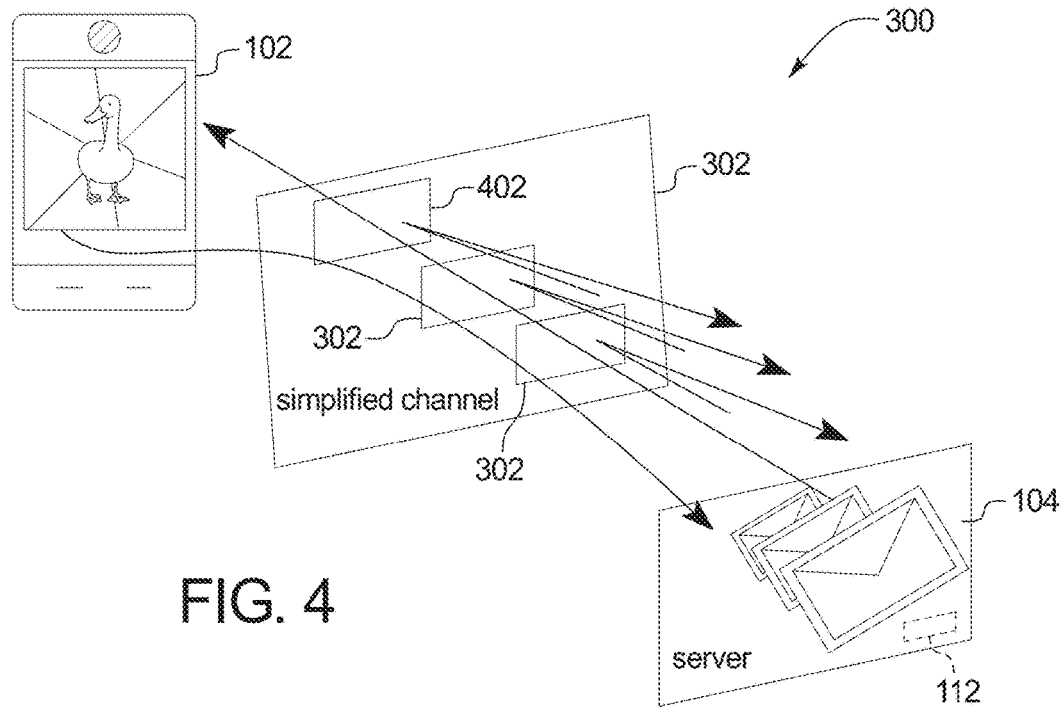
FIG. 4 shows a diagram of backscattered channel information during the communication session between the server and the client device using the communication channel of FIG. 3.

FIG. 4 shows a diagram of backscattered channel information 402 during the communication session 300 between the server 104 and the client device 102 using the communication channel 302 of FIG. 3. From the point of view of the server 104 (or a trusted proxy), a complete communication with the client device 102 includes two distinct segments: information sent to the client device 102 and information received from the client device 102 in response to the information sent. Information 402 regarding the progress of channel components in processing, realizing and rendering information and inter-device signaling events, scatter back to the server 104. If the server 104, via the security processor 112, subtly varies the content that it sends to the client device 102 through soft messaging, the effects of the changes will be detectable in the echoed information returning back to the server 104 from the various components and processing layers of the channel 302.

The a priori knowledge of the information transmitted by the server 104 (the information and stimuli actually sent into the channel 302 to the client device 102) together with the global and local backscatter information 402 from the components and layers of the channel 302, permit the server 104 (or a trusted proxy) to form a prediction as to the condition of the final, post-processing, fully rendered version of the information displayed by the client device 102. Additionally, direct, client device initiated, response messages to the server 104 (e.g., mouse clicks or user supplied account information) constitute a means for the security processor 112 to determine a prediction as to the fully rendered version of the information displayed by the client device 102. The information in the response from the client device 102 can be entered by a user using a mouse, keyboard, touchscreen, an infrared ID tag scanner, etc. For example, information of a returned mouse click informs the security processor 112 that a selectable box was 1) rendered, 2) selected, and 3) the click was preformed at (x, y) pixel coordinates.

The security processor 112 determines discrepancies between the prediction and the direct, client device 102 initiated responses of the fully rendered information to detect and identify errors (e.g., malicious applications 304) in the channel 302. The detection and identification of channel error causes the security processor 112 to alter normal operations of the server 104. In some embodiments, the security processor 112 may cause the server 104 to enter a safe operations mode, restrict authorized client device activities, and/or generate an alert and/and/or alarm.

The Use of Soft Messaging for Channel Verification

As discussed above, the security processor 112 can use different types and variations of soft messaging and information to help identify malicious applications. This variation helps prevent malicious applications from reverse engineering the soft messaging and circumventing the approaches described herein. As described below, the variation can include changes to font size, changes to web page arrangement of hard information and graphics, addition of characters to user inputs, changes to function definitions, requests for user prompts through banners and pop-up windows, or implementations of bugz. The variation can also include changing an order in which hard and soft information is sent from a server 104 or a client device 102.

The order in which information arrives at a server 104 or client device 102 is not relevant for business purposes. The inclusion of additional information, for example the pixel location of a mouse click, cursor, or scroll bar (e.g., soft information) in addition to account information (e.g., hard information) does not affect the business purpose. The method of encoding information, and within reasonable bounds, the amount of time information spent in transmission of channel 302 have a generally neutral impact on business purposes. "Soft" choices consistent with the "hard" business purpose exist at many layers of the channel 302 ranging from the choice(s) of physical method(s) used, transmission encoding method(s) used on the physical layer (s), to aesthetic details of information presentation and user interactions with a presented webpage. The choice of soft messaging by the server 104 (or its trusted proxy) corresponding to given hard information is a many-to-one mapping. In a similar way, the local, specialized function and contribution of each network and client device specific hardware and software channel component is decomposable into hard and soft elements consistent with achieving the overall, global intent of the interaction of the server 104 with the client device 102.

The security processor 112 accordingly maintains hard functionality of the server-client device connection (e.g., the session 300) while varying the soft information. Soft information variations are recorded a priori by the security processor 112 or the server 104 (or its trusted proxy) in a data structure to create a large set of composite (hard and soft) messages to be transmitted together. In other embodiments, the server 104 may transmit the hard messages separate from the soft messages. The soft variations are constrained by the fact the final presentation at the client device 102 must be intelligible, not garbled. Further, the soft variations must be of sufficient complexity that the malicious applications 304 are faced with a time consuming reverse engineering problem in deciphering the accumulated impact of the soft message changes throughout the channel 302.

The Use of Bugz in Soft Messaging for Channel Verification

As mentioned above, the security processor 112 may use implementations of bugz in soft information variation. Bugz are anomalous, device, software, protocol and/or physical communication medium specific interpretations of input instructions that produce consistent although unexpected output. Bugz are inherent in many components of the channel 302 and are generally undetectable by malicious applications 304 without significant processing and analysis. The use of bugz helps enhance the complexity of soft messaging by enabling the security processor 112 to craft soft information so that the soft degrees of freedom within and between hardware and software based components of the channel 302 are combined in a multiplicative fashion. While four examples of bugz are described below, the security processor 112 can implement any type of bugz in soft messaging.

One type of bugz is based on different operating systems of client devices 102 processing the same incoming packet streams differently. As a result of this bugz, the security processor 112 can create soft messaging packet streams indented to induce certain known behaviors in an operating system to display hard information. Another type of bugz is based on different operating systems of client devices 102 interpreting the same portion of Extensible Markup Language ("xml") code differently. Prior to initializing its service to a client device 102, a server 104 or security processor 112 selects from a variety of ways that a portion of xml code may be written and select from a variety of ways to order, time delay, and geographically position the way the packets containing that code are transmitted into the channel 302.

Yet another type of bugz is based on HyperText Markup Language ("html") code and cascading style sheet instructions that can be written and combined in contrasting and confusing fashion by a server 104 or the security processor 112. The server 104 can also use different layers of the style sheet in opposition of each other. For example, the security processor 112 could instruct a server 104 to randomize which portions of a webpage are sent in style sheet instructions at sequential times. As a result, a malicious application 304 is unable to easily determine which style sheet instruction corresponds to which portion of the webpage.

A further type of bugz is based on code libraries that are internally re-arranged by the security processor 112 so that functions that use the code libraries on client devices 102 are contrasted with expected performance in accord with the usage conventions of the standard library. For example, the security processor 112 can use this type of bugz to swap the definitions of the "add" and "multiply' functions. As a result of this swap, the client device 102 performs the intended function while a malicious application 304 incorrectly determines that a different function is being performed. As a result, the security processor 112 can determine if a malicious application 304 attempts to change a result of the function or transaction.

Often the ultimate resolution of the purposefully mis-engineered "spaghetti" code applied by the security processor 112 in soft messaging depends on a browser type and version at the client device 102. Java script and bytecode, for example, may be similarly obfuscated by the security processor 112 without negatively detracting from run time performance or the ability of the server 104 and client device 102 to conduct business. These effects of the examples described above may be enhanced by incorporating operating system and browser bugz into the instructions. The result of this incorporation is a soft formatting and presentation style at a client device endpoint that makes it difficult for malicious applications 304 to predict and/or automatically interpret the soft information. This makes the soft information difficult for the malicious applications 304 to alter, replace, or counterfeit in real time. Although this encoding is difficult to interpret in real time, it may be easily tested experimentally, a priori by a server 104 (or its trusted proxy). It is this a priori knowledge of the unperturbed and fully implemented rendering of the instruction set at the client device 102 that forms the basis of the prediction determination made by the security processor 112 of the formatting at the client device endpoint. The example security processor 112 creates the variation among the soft messages to increase the differences between the prediction and direct versions of the fully rendered information displayed by the client device 102.

Figure 5:
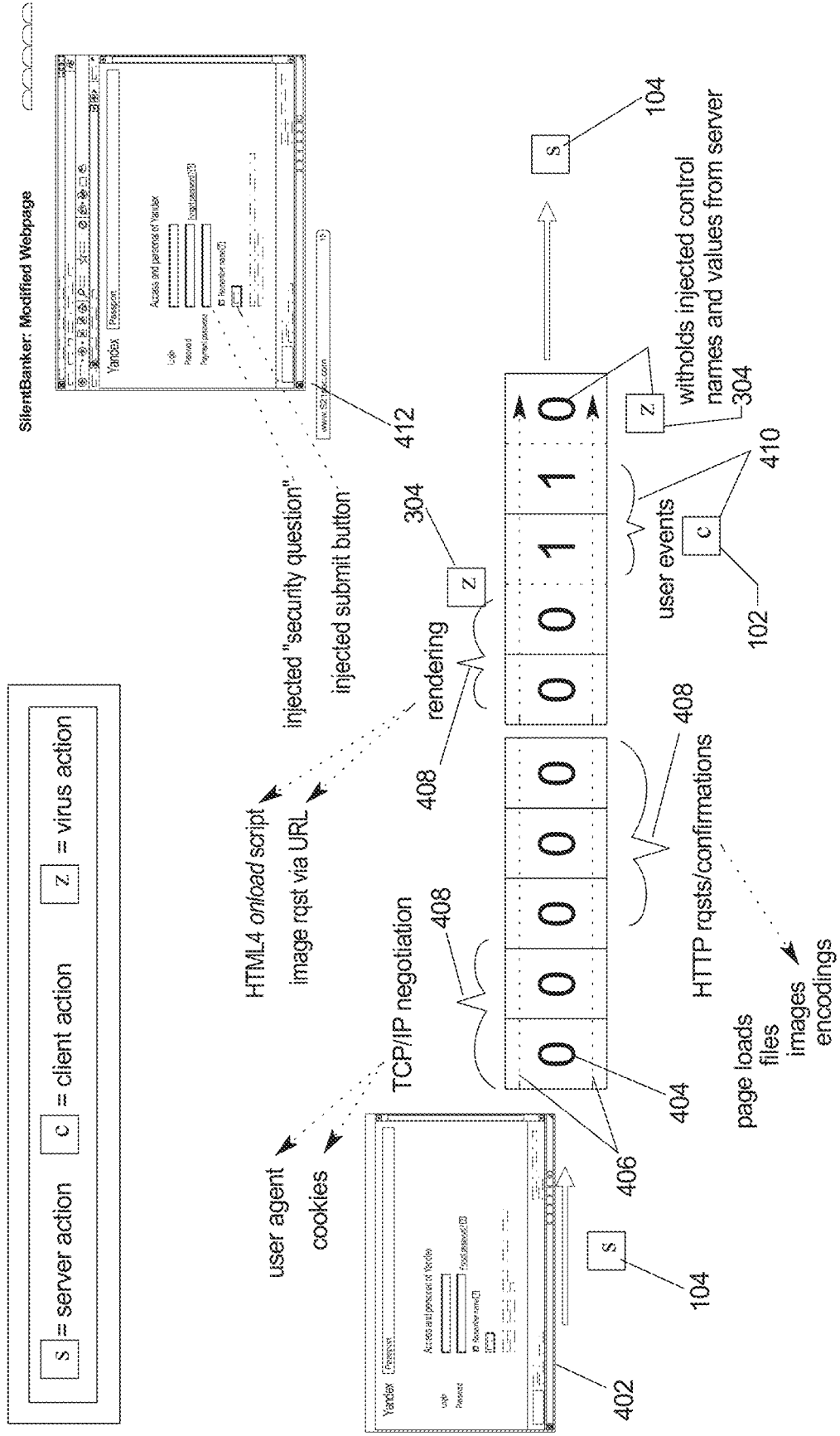
FIGS. 5 and 6 show diagrams representative of a malicious application affecting the communication session of FIG. 3 between the client device and server.
Figure 6:
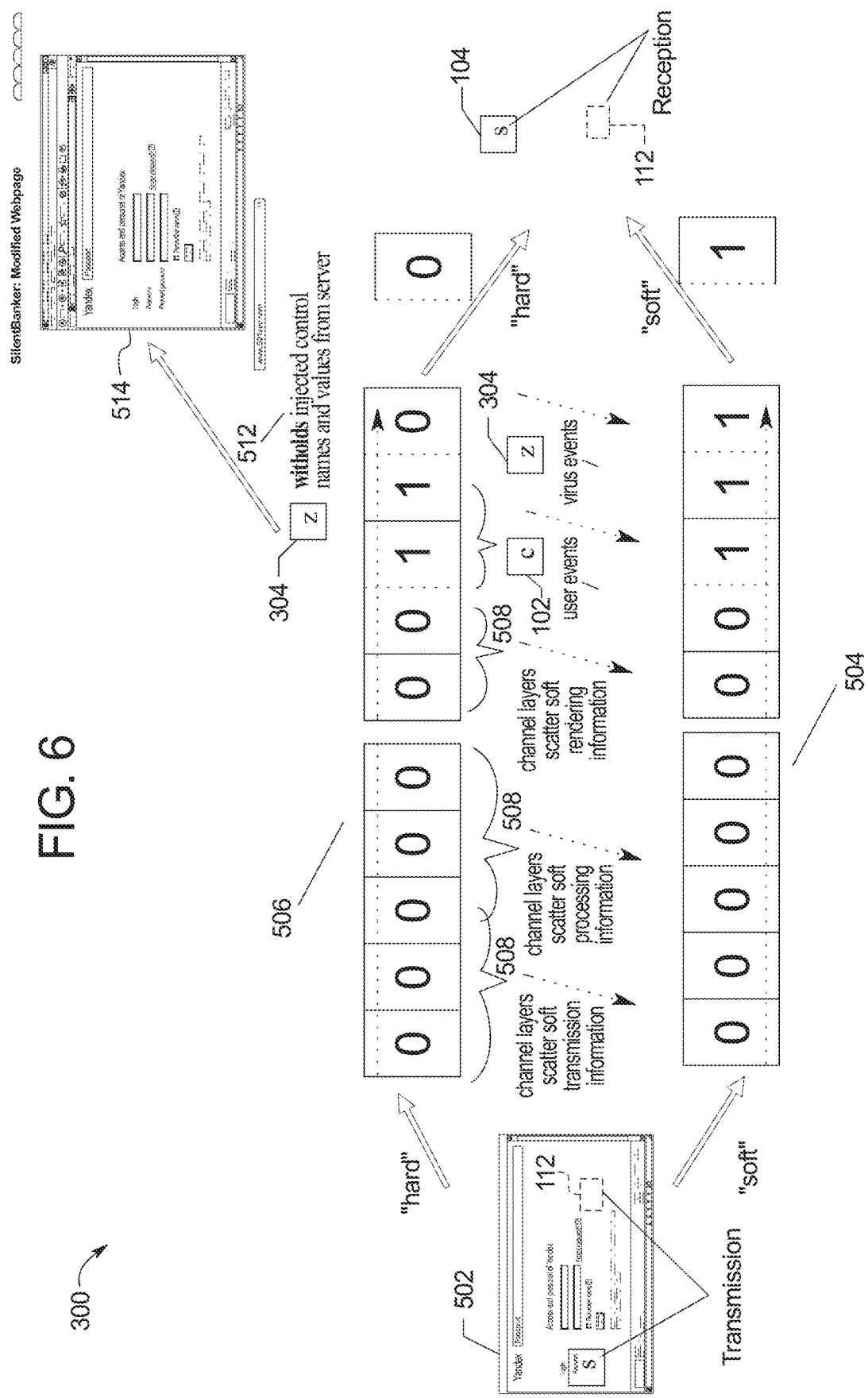

A Comparative Example of Channel Verification with and without the Security Processor FIGS. 5 and 6 show diagrams representative of a malicious application 304 affecting the communication session 300 between the client device 102 and server 104. In particular, FIG. 5 shows the affects of the malicious application 304 when the server 104 does not include a security processor 112 and FIG. 6 shows the affects of the malicious application 304 when the server 104 includes the security processor 112. It should be noted that FIGS. 5 and 6 are only one example of communications between a client device 102 and server 104. Other examples can include additional affects by malicious applications 304 and/or different types of transactions performed between the server 104 and client device 102.

In FIG. 5, the server 104 intends to communicate a deliberate, per-determined datagram 402 to client device 102. Here, the datagram 402 is a webpage that prompts a user to provide a username and password. The pre-determined datagram 402 is represented as a binary form for transmission purposes, shown in FIG. 5 as the number "0" in data transmission 404. The final, fully rendered, intended, client device intelligible and/or useable form of the data transmission 404 is known to the server 102 (or its proxy) at and/or before the time of the data transmission to the client device 102.

The pre-determined, intended data transmission 404 progresses through and/or is processed by the various hardware and/or software based components, layers, and protocols of channel 302. The sequence of "0's" represents the original intent of the server 104 and is represented in FIG. 5 as a sequence of "0's" progressing through a sequence of rectangles in the direction of the dashed, horizontal arrows 406. The upper arrow represents the sequence of processing events experienced by the "hard" portion of the data and the lower arrow represents the sequence of processing events experienced by the "soft" data. The soft and hard data transmission paths may or may not be the same and may or may not entail identical processing events.

As transmitted data 404 progresses through and/or is processed by the channel 302 with the original intent of the server 104 intact, secondary information 408 generated by the routing and processing of the data 404 is scattered back through the channel 302 to the server 102. The secondary information 408 can include, for example, an operating system of the client device 102, a browser type used by the client device 102, a cascading style sheet type used to display the soft/hard information, java script information, byte code data, etc. In other instances, the secondary information 408 may be reported by the client device 102 as device information after initiating the communication session 300 with the server 104. The secondary information 408 is generated, for example, from Transmission Control Protocol/Internet Protocol ("TCP/IP") negotiation, Hypertext Transfer Protocol ("HTTP") requests and conformations, and/or rendering information. In other examples, the secondary information 408 can be generated through other channel 302 backscattering routing and/or processing.

During transmission of the data 404 to the client device 102, the malicious application 304 creates channel noise 410, which alters the data 404. The channel noise 410 causes an intelligent modification of the data 404 to be realized at the client device 102 instead of the original pre-determined datagram 402. This alteration is represented in FIG. 5 as the number "1" and may incorporate hard and/or soft information.

The client device 102 receives the final, fully rendered, client device intelligible form of the data as altered by the malicious application 104 and displays this data as datagram 412. Here, the channel noise 410 adds a security question to the webpage and moves the location of a 'submit' button to accommodate the security question. As a result, of this channel noise 410, the server 104 believes the client device 102 is viewing datagram 402 when in fact the client device 102 is viewing altered datagram 412. Further, a user of the client device 412 has no reason to be suspicious of the datagram 412 because the maliciously inserted security question appears to coincide with the remainder of the datagram 412.

When the client device 102 returns a response message to the server 104, the malicious application 304 detects the response and uses channel noise 410 to remove the answer to the security question. This is represented by transition of the data 404 from "1" to "0" before the data reaches the server 104. As a result, the server 104 receives a response from the client device 102 that only includes the username and password. The server 104 never received an indication that the client device 102 provided a response to a security question, and, accordingly, never detects the presence of the malicious application 304. The malicious application 304 remains hidden to carry out further stealthy compromises of account security.

FIG. 6 shows how security processor 112 can validate communications between the server 104 and the client device 102 during the same communication session 300 described in conjunction with FIG. 5. Similar to FIG. 5, the server 104 in FIG. 6 is to transmit a request for a username and password to access an account. However, unlike in FIG. 5, the security processor 112 in FIG. 6 specifically creates the soft content of a deliberate, pre-determined datagram 502 before transmission to the client device 102.

FIG. 6 shows soft information 504 and hard information 506 transmitted by the server 104. The security processor 112 varies the soft data 504 from one client-server connection to the next to prevent the client device 102 or the malicious application 304 from knowing the components of the soft information 504 beforehand. The soft information 504 is however fully understood by the server 104 (or its trusted proxy) by the time of transmission to the client device 102. The server 104 stores the soft information 504 to a data structure to help form a prediction as to a response from the client device 102. The server 104 initiated soft and hard information 504, 506 is shown as "0's" in the blocks.

Figure 7:
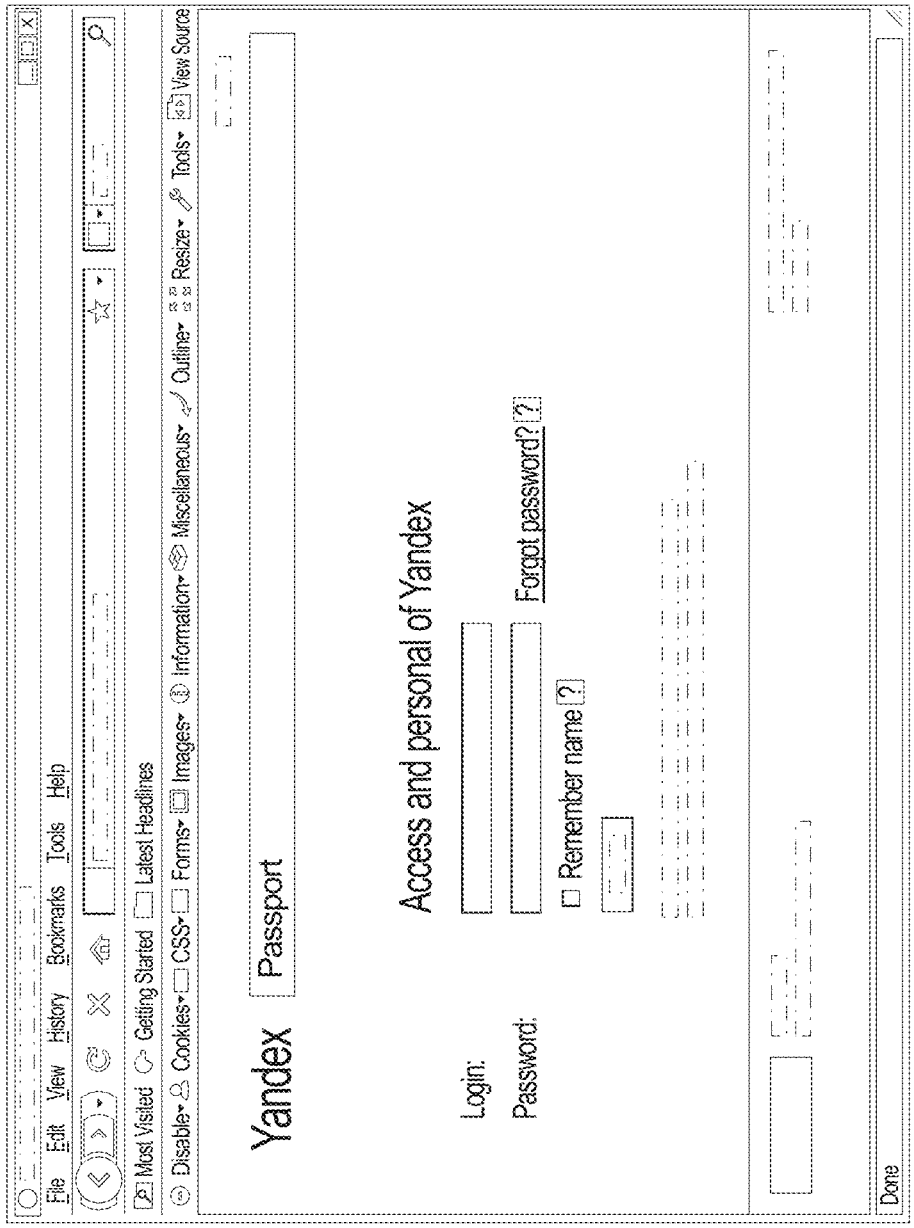
FIGS. 7 to 9 show datagrams created by a security processor to identify malicious applications.

During the communication session 300, the propagations of the soft and hard information 504, 506 through channel 302 cause secondary information 508 to be generated. The secondary information 508 is scattered back to the server 104 and the security processor 112. The security processor 112 uses the secondary information 508 in conjunction with the soft information 504 to form a datagram 510 of the prediction. FIG. 7 shows an enlarged image of the datagram 510 including the request for the username and password. The server 104 uses the datagram 510 to predict how the client device 102 will process, render, and display datagram 502. In other embodiments, the security processor 112 stores the secondary information 508 in conjunction with the soft information 504 in a data structure rather then rendering datagram 510.

Similar to FIG. 5, the malicious application 304 uses channel noise 512 to alter the soft and/or hard data 504, 506, which is shown in FIG. 6 as the number "1." As before, the alternation includes the addition of a security question and the movement of the 'submit button.' The client device 102 then receives, processes, renders, and displays the altered data.

Figure 8:
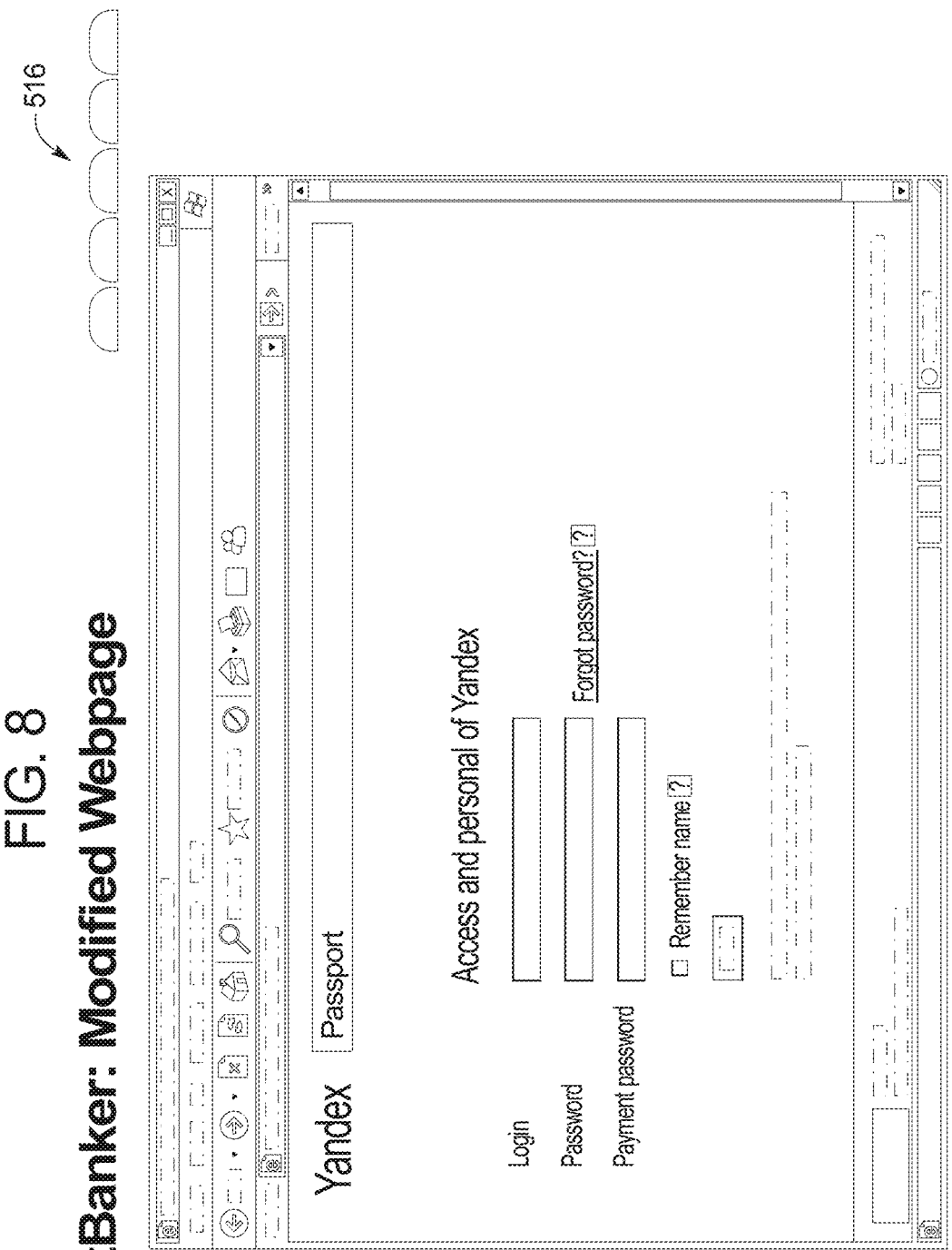

A rendered datagram 514, as displayed by the client device 102, is displayed in FIG. 8. This datagram 514 shows a security question prompt below the prompts for the username and the password. In addition, the 'submit' button and corresponding text have been lowered in the datagram 514 to make room for the security question. As a result, the security question appears to be genuine to a user of the client device 102.

After displaying the datagram 514, the client device 102 transmits a response, which also includes hard and soft information. Similar to FIG. 5, the malicious application 304 uses channel noise 510 to remove the response to the security question, which is shown in FIG. 6 in the transition of the hard information 506 from "1" to "0." However, while the malicious application 304 removed the hard information 506, the malicious application 304 is not concerned with the mouse click information, and accordingly does not alter the soft information 504.

In FIG. 6, the server 104 and the security processor 112 receive the response from the client device 102, including the hard and soft information 504, 506. The security processor 112 compares the soft information 504 to the prediction and is able to determine that the communication session 300 has been compromised. In other words, the security processor 112 detects the malicious application 304 by determining that the coordinates of the mouse click on the 'submit' button do not match the coordinates of the 'submit' button made during the prediction.

Figure 9:
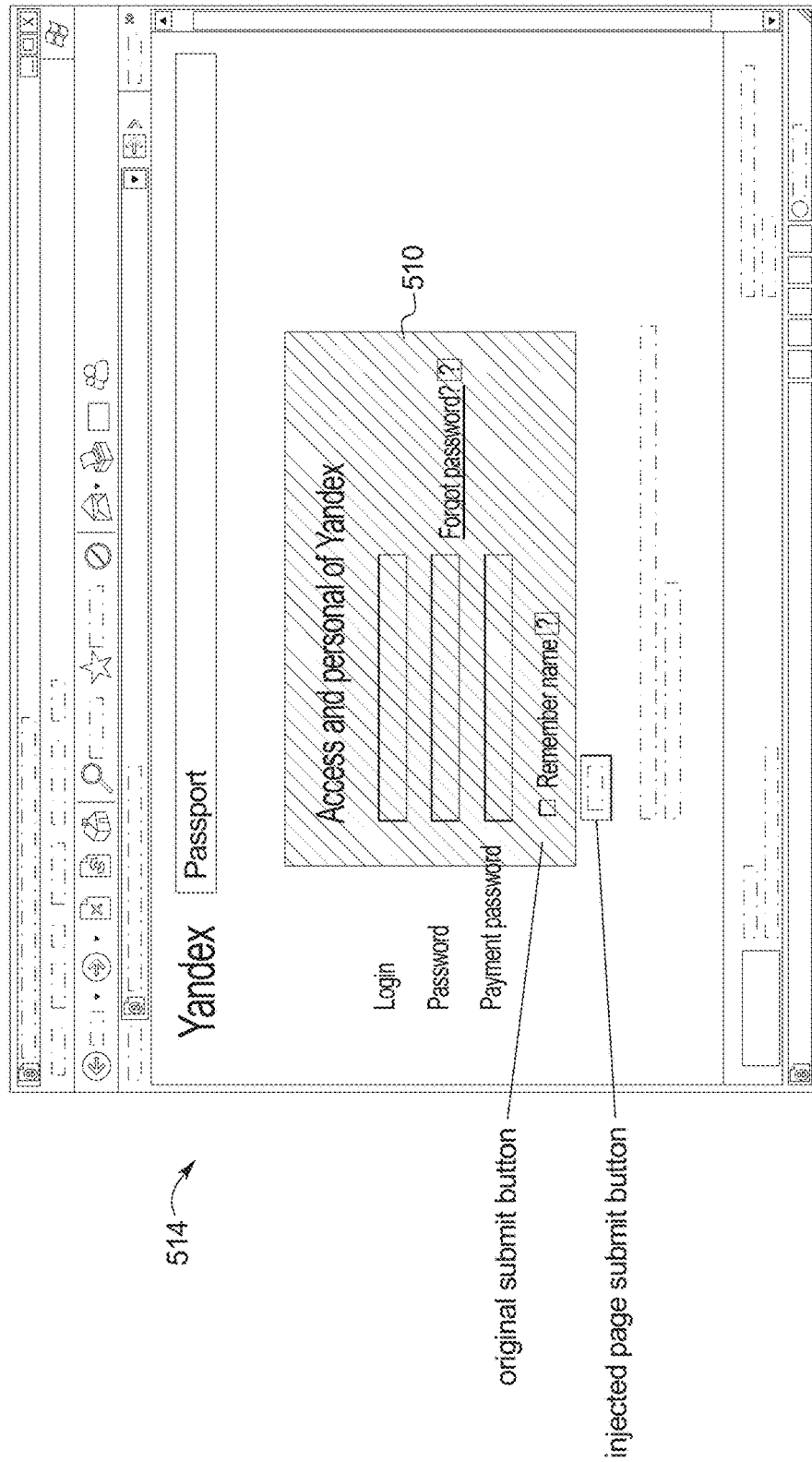

FIG. 9 shows a diagram of a comparison datagram 516 representative of the comparison made by the security processor 112 to determine if a malicious application is affecting communications between the server 104 and the client device 102. The comparison datagram 516 includes the prediction datagram 510 formed by the security processor 112 and a construction of the datagram 514 based on the soft and hard information received from the client device 102. For visually effect, the prediction datagram 510 is superimposed upon the datagram 514 from the client device 102.

As shown in FIG. 9, the geometry of the datagram 514 is altered, in particular the position of the 'submit' button as a result of the space needed to reformat the page and accommodate the additional bogus security question. In addition to the location of the data fields, the datagram 514 includes soft information 504 such as a position of a mouse click associated with the 'submit' button. In this example, the server 104 requests that the client device 102 report the mouse click as soft information, for example, by relying on a "hidden in the clear" communication protocol. In some examples, the server 104 or security processor 112 may embed the authentication form in a "trendy" image so that the relative coordinates of the mouse clicks are returned as a matter of routine and not detected by the malicious application.

In this authentication page example, by comparing the prediction position of the 'submit' button with the directly reported position, the security processor 112 detects whether an error has occurred during communication session 300. Here, the security processor 112 detects that the datagram 514 does not align with the datagram 510, and accordingly determines that the malicious application 304 is affecting communications.

In some embodiments, the security processor 112 may determine an allowable deviation or threshold for datagram 510. Thus, as long as, for example, the 'submit' button is located within the allowable deviation, the security processor 112 determines that communications are not being affected by malicious applications. The security processor 112 may determine what an allowable deviation is for the datagram 510 based on, for example, secondary information 508, characteristics of the client device 102, or history information of how the datagram 510 has been displayed by other client devices.

Examples of Channel Verification Using Different Types of Soft Messaging

As disclosed, the security processor 112 uses different types and variations of soft information and soft messaging to validate communication channels between servers 104 and client devices 102. The types of soft information and messaging can include changes to font size, changes to web page arrangement of hard information and graphics, addition of characters to user inputs, changes to function definitions, requests for user prompts through banners and pop-up windows, or implementations of bugz. The following sections describe how the security processor 112 uses different types of soft information and messaging.

Soft Messaging Using Text Size and Font Variations

FIG. 10 shows a diagram of a datagram 1000 that includes a code section 1002 and a result section 1004. The datagram 1000 illustrates how soft information can be selected or created by the security processor 112 in code section 1002. The datagram 1000 also shows how the soft information would be displayed on a client device 102 in the result section 1004.

FIG. 10 shows that character sets, font types and point sizes may be varied by the security processor 112 from session to session. These variations are in addition to the geometrical and content related soft-variations described in the previous comparative example. In the code section 1002, keyboard and mouse functionality may be made functions of a number of characters typed or x, y coordinates of text boxes. These modifications may be subtle and may also be made session dependent. The security processor 112 may invoke changes using any seemingly contrasting combination of coding instructions via html, xml, CSS javascript, byte code, etc. The security processor 112 may also invoke changes by altering or restricting elements available for coding instructions to draw from, for example, available character sets.

For example, in the datagram 1000, the security processor 112 is subject to a ruleset based on the hard information that is required to be transmitted (e.g., the prompt for a username and password). Here, the security processor 112 selects soft information or message variation such that for the fully processed and rendered information presented to the client device 102 is structured so that the username transaction field is to be rendered by a client device 102 in a font size of 12, the first password field is to be rendered in a font size of 13, and the second password field is to be rendered in a font size of 14. In other examples, the security processor 112 may also vary a font type, font color, font weight, or any other text variation allowable for the corresponding hard information.

The variation among the font sizes is used by the security processor 112 to form a prediction. For instance, the name provided by the client device 102 is to be in 12 point font while the first password is to be in 13 point font. If a malicious application uses channel noise to alter the username or password responses or add a second transaction, the security processor 112 is able to detect the modification by the malicious application if the returned font size does not match the prediction. If the malicious application is more sophisticated and processes the soft information returned from the client device 102 to determine the font size, the extra time spent processing the information provides an indication to the security processor 112 that a malicious application is affecting communications. As a result, the soft messaging makes it relatively difficult for a malicious application to go undetected by the security processor 112.

Soft Messaging Using Programmed Keystrokes

In another embodiment, the code section 1002 may include code that instructs a client device 102 to program-matically generate keystrokes based on keystrokes provided by a user. The security processor 112 uses the algorithm for the programmatically generated keystrokes to form a prediction. The security processor 112 transmits the algorithm for the programmatically generated keystrokes through xml code, java code, etc. The security processor 112 may also use the programmatically generated keystrokes in Document Object Models ("DOMs") of hidden form fields.

Upon receiving the code, the client device 102 applies the algorithm to the specified data fields. For example, one algorithm may specify that the letter 'e' is to be applied after a user types the letter 'b' and the number '4' is applied after a user types the number '1.' When the user submits the entered text, the client device 102 transmits the user provided text combined with the programmatically generated keystrokes in a response message. For instance, in the result section 1004 of FIG. 10, the client device 102 may add keystrokes to the user provided username or password.

A malicious application that uses channel noise may attempt to, alter text, inject text, or additional data fields into the response from the client device 102. However, the security processor 112 is able to identify which text was affected by the malicious application based upon which of the received text does not match the algorithm-based keystroke prediction. As a result, the security processor 112 is able to detect the malicious application.

Soft Messaging Using Function Modification

In a further embodiment, the code section 1002 may include code that changes a library definition of one or more functions. For example, the code section 1002 could specify that a function named 'add' is to perform division and that a function named 'subtract' is to perform addition. The security processor 112 uses the library definitions to form a prediction of a response from a client device 102. The security processor 112 transmits the library definition through, for example, xml code, java code, etc.

Upon receiving the code, the client device 102 applies the changed library definitions to the specified data fields in, for example, the result section 1004 of FIG. 10. In one instance, the client device 102 may prompt a user to enter a result of a mathematical equation as part of an authentication process or when entering a number of related transactions. A malicious application, attempting to alter the authentication or inject additional transactions, examines the response from the client device 102. The malicious application only sees, at most, the name of the function performed, not the definition of the function. As a result, the malicious application alters the data or applies transactions consistent with the name of the function. However, the security processor 112 is able to detect the malicious application because the received altered response would not be consistent with the functional definitions stored to the prediction.

Soft Messaging Using Un-rendered Page Elements

Figure 11:
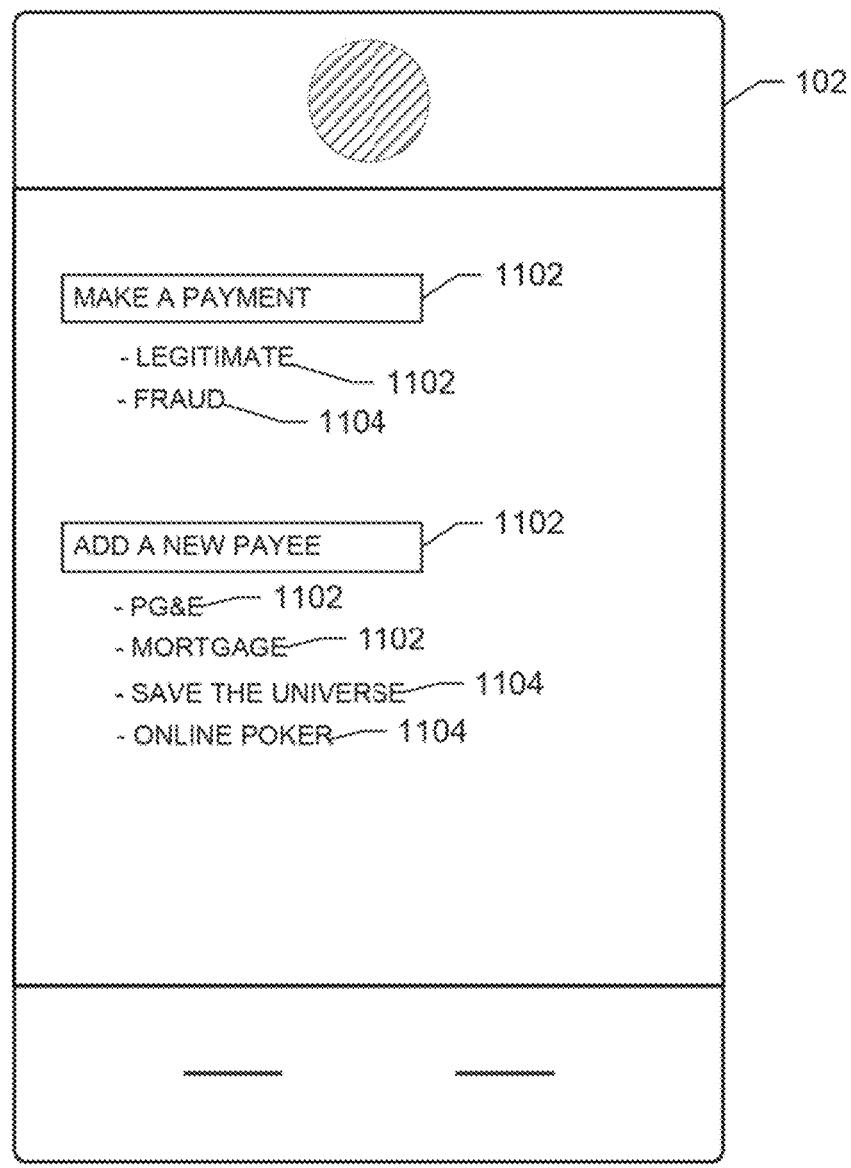
FIG. 11 shows a client device including rendered information and un-rendered information as a variation of soft messaging.

FIG. 11 shows client device 102 including rendered information 1102 and un-rendered information 1104 as a variation of soft messaging. The rendered information 1102 is displayed to a user by the client device 102 while the un-rendered information 1104 is not displayed but instead is included within source code of soft information for a document. The security processor 112 uses the un-rendered information 1104 to determine if a malicious application is affecting communications with the client device 102. For instance, the security processor 112 detects a malicious application if an altered response from the client includes reference to the un-rendered information 1104 or accommodates the un-rendered information 1104. While FIG. 11 shows the un-rendered information 1104 as titles, the un-rendered information 1104 may also include redundant/multiple passwords, redundant/multiple forms, or redundant/multiple logical structures in DOM.

Generally, malicious applications use un-rendered, machine-readable source code to perform functions instead of the rendered version of the code. The reason is that rendering the code takes additional time and resources that may expose the malicious application. In the example shown, soft information applied to the source code by the security processor 112 enables the introduction of title and tag variations, redundancies, substitutions, embedded requests for data downloads from arbitrary locations, logical obfuscations, piecewise delivery of a final edition of machine-readable source code, transformations of the machine-readable source code based on features of previous or currently rendered pages, transformations of the machine-readable source code based on intended client interactions with previous or currently rendered pages, etc. in the machine source code version of the page.

The soft modifications applied by the security processor 112 to the machine-readable source code produce a consistent, useable, non-varied rendered page to the intended user while producing a different varied page to the malicious application. In this manner, the intended user interacts freely with the rendered page while the attempts of the malicious application to interact with the un-rendered, machine-readable source results in a failure to interact with the source code. The un-rendered information 1104 may also cause the malicious application to experience excessively long task completion times.

Any modifications or alterations performed by a malicious application result in the activation of placeholder source page elements, which are processed and returned to the security processor 112 as indications that the returned information is based on an edition of the machine source code that was not the final edition intended for the end user. Additionally, the security processor 112 is able to detect that a malicious application altered a response from the client device 102 when the received information includes data with geographic locations or bogus data fields that correspond to the soft information of the un-rendered information 1104. For instance, the security processor 112 detects a malicious application if the response from the client device 102 includes a payee after the 'Online Poker' payee.

In addition to using data fields of un-rendered information 1104, the security processor 112 can also use behind-the-scenes, un-rendered, machine-readable source code used to generate communications. The security processor 112 may also use decision process interfaces for the intended client device 102 in technologies where the communications occur via physical medium and protocols other than HTTP traffic traveling through the network 110. Some of these communication examples include Short Message Service ("SMS") messaging, manufacturing control process signals and protocols (e.g., Foundation Fieldbus, Profibus, or Hart Communication Protocol), and/or infrared or Bluetooth-based communications. The soft messaging techniques may be used by the security processor 112 when the delivery mechanism is not Internet/HTTP based as a way to differentiate between end user presentation, end user interface level and the machine source level of response, and/or interaction with delivered content or information.

In instances when a malicious application uses the interactions and/or input of a legitimate user via a client device 102 as a means to guide itself through the logical flow of the obfuscated, machine-readable source code, the security processor 112 may use soft information that includes the creation of additional "user" input events by the system. Examples of these user input events can include, but are not limited to, keyboard events, user focus events, mouse clicks, mouse rollovers, cursor movements etc. The specific details of the soft information or messaging generated user events are known prior to the security processor 112 as the prediction and may be later removed by server 104 or the security processor 112 to recover the legitimate client device 102 and/or end users intent.

Additionally, in instances when a malicious application exports machine-readable source code to be rendered for processing and/or navigation by a substitute recipient, the security processor 112 can use soft messaging variations among an operating system, a layout engine, a browser, Cascading Style Sheets ("CSS"), java script, bugz, and/or peculiarities acting individually or in combination so that the exported source code compiles and/or renders differently for the substitute client than it does for the originally intended end user. The just-in-time nature of the delivery of the final edition of the machine-readable source code to the intended client device 102 also differentiates between page versions, content versions compiled, and/or rendered at the communicating client device 102. The communicating client device 102 may be the original, intended client or a substitute of the malicious application. The substitute client device may be a computer program and/or technology that replicates the intended end user's powers of observation, recognition and/or understanding.

Soft Messaging Using Graphical Elements

Figure 12:
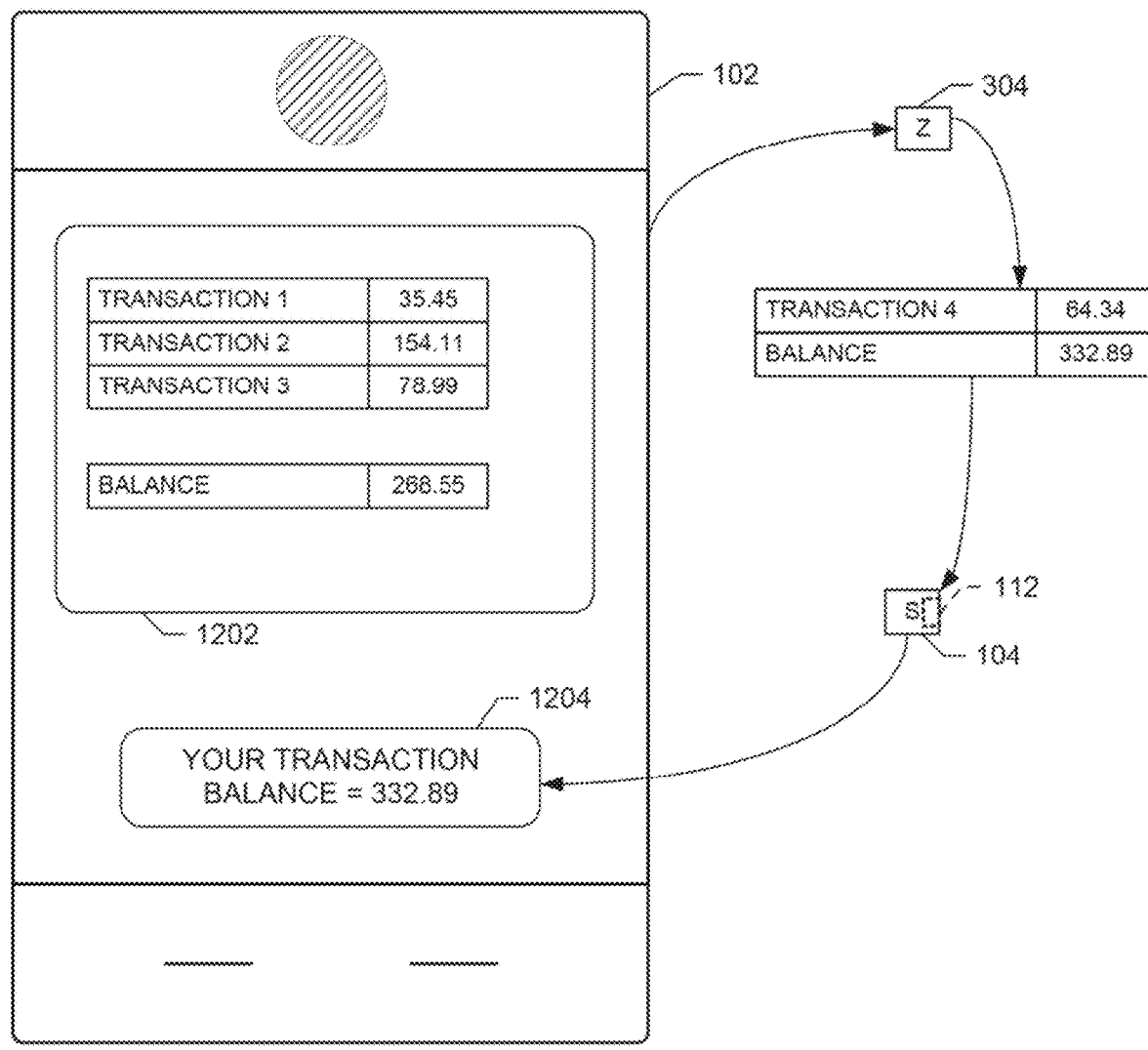
FIG. 12 shows a security processor validating a transaction between a client device and a server.

FIG. 12 shows a client device 102 conducting a transaction with a server 104. The transaction is displayed in datagram 1202 and includes three separate transactions totaling an amount of 268.55. In this example, a malicious application 304 intercepts the transmission of the datagram 1202 from the client device 102 to the server 104. The malicious application 304 uses channel noise to add a fourth transaction and a new balance of 332.89 to the datagram 1202. As a result, the server 104 receives four transactions and the correctly appearing balance of 332.89.

To prevent such fraud, the security processor 112 uses graphical elements 1204 as soft information to verify the data transmitted by the client 102. The use of graphical elements 1204 enables the security processor 112 to validate channel communications when a client device 102 is the originator of hard and soft information. In other words, the security processor 112 uses graphical elements 1204 to confirm communications with the client device 102 when the security processor 112 may not be able to form a prediction because the client device is the originator soft and/or hard information. The graphical elements 1204 may be presented to the user of the client device 102 as, for example, a banner, background, image, part of an advertisement, or a video. In some examples, the security processor 112 can use variations in graphical elements 1204 as soft information in conjunction with other soft messaging techniques discussed above.

In the illustrated example of FIG. 12, the security processor 112 transmits the graphical element 1204 to the client device 102. The security processor 112 embeds the balance information as code included within the graphic, which helps prevent the malicious application 304 from detecting and using channel noise to alter the balance to the amount provided originally by the client device 102. The client device 102 accordingly displays the graphical element 1204 including the balance received by the server 104. The user can then compare the balances and provide feedback that the balances do not match by, for instance, selecting the graphical element 1204. In response, the security processor 112 instructs the server 104 to disregard the datagram 1202.

In an alternative embodiment, the security processor 112 enables the client device 102 to supply comparison information. For example, a 'submit these transactions' button may be presented by the client device 102 as an active, account balance indexed grid. A user of the device 102 is expected to activate that portion of the button corresponding to the traditionally displayed account balance. As in the previous examples, the details of this button may be session dependent.

In another example, the client device 102 may be enabled by the security processor 112 to send a screen capture of the account information in the datagram 1202 to the server 104 for automated comparison by the security processor 112. The background and other features of the screen capture may be session dependent to prevent counterfeiting. For example the security processor 112 may specify in soft messaging whether the client device 102 is to create and forward a snapshot of the top ⅔ of an account balance or the lower ⅔ of the account balance and/or a blank image followed by the account balance.

Multiple Predictions for a Single Session Embodiment

Figures 13, 14:
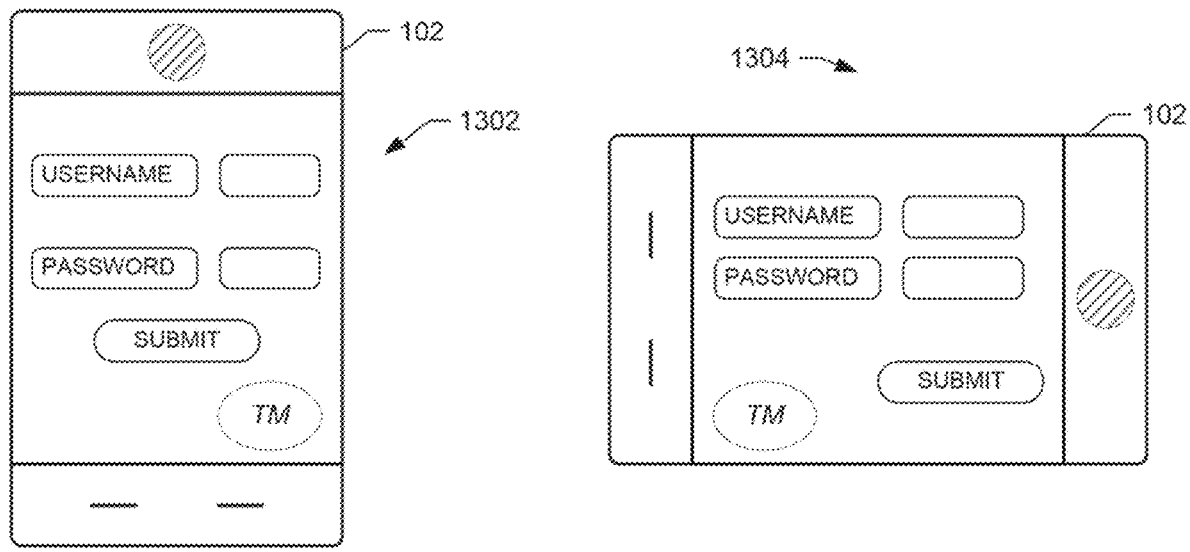
FIG. 13 shows an illustration of two different configurations of a client device that can be accounted for by a security processor to create multiple predictions.
FIG. 14 shows a diagram of a data structure 1400 of a prediction formed by a security processor based on soft information and secondary information acquired from global and local observable temporal channel information.

FIG. 13 shows an illustration of two different configurations of a client device 102 that can be accounted for by the security processor 112 to create multiple predictions in some embodiments. In this example, the security processor 112 creates two different predictions based on an orientation of client device 102. The first prediction corresponds to the client device 102 being in a vertical orientation 1302 and the second prediction corresponds to the client device being in a horizontal orientation 1304.

Oftentimes, many smartphones and tablet computers can display information based on how the device is orientated. However, the orientation of the device is generally not reported back to a server 104 through backscattered secondary information. As a result, the server 104 does not know the orientation of the device when the hard information is displayed. To compensate for this lack of information, the security processor 112 creates two different predictions. In some embodiments, the security processor 112 may generate, by default, multiple predictions regardless of a type of client device 102 to account for different screen sizes, orientations, etc. In other embodiments, the security processor 112 may generate a second prediction only after receiving backscatter information that indicates the client device 102 corresponds to a type of device that can have more than one orientation.

In the illustrated example of FIG. 13, the security processor 112 creates a first prediction as to how the hard information (e.g., username, password and 'submit button) is displayed based on the received soft information. The security processor 112 determines that coordinates of the features displayed by client device 102 have to fit within the vertical orientation 1302 of the client device 102. Similarly, the security processor 112 creates a second prediction as to how the hard information will be displayed within the horizontal orientation 1304. The differences between the orientations 1302, 1304 can include spacing between data fields, sizes of the data fields, location of the 'submit' button, and a location of the trademark. The security processor 112 then compares a response from the client device 102 to each of the predictions to determine if a malicious application is affecting communications.

Prediction Data Structure

FIG. 14 shows a diagram of a data structure 1400 of a prediction formed by the security processor 112 based on soft information and secondary information acquired from global and local observable temporal channel information. The data structure 1400 is representative of information used by the security processor 112 to form the prediction. In other embodiments, the security processor 112 may render a webpage based on the soft and secondary information, similar to the datagram 510 of FIGS. 5 and 7.

The example security processor 112 uses the information in data structure 1400 to determine if a response from a client device 102 is indicative of a malicious application affecting communications. The security processor 112 creates the data structure 1400 by storing soft information used in soft messaging by a server 104. The security processor 112 supplements the data structure 1400 with secondary information received as backscatter information. As mentioned before, the soft information describes how hard information is displayed or presented while the secondary information provides indications how the soft and hard information are to be displayed on a client device 102.

In the illustrative example of FIG. 14, the soft information includes font type, font size, and positioning of three text fields. The soft information also includes coordinates of a 'submit' button including an allowable deviation or predetermined threshold. The soft information further includes programmed text to be generated automatically in the text fields and a location of a banner graphical element. In addition, the soft information includes un-rendered text at specified coordinates.

Also in the data structure 1300 of FIG. 14, the secondary information includes a browser type and operating system of the client device 102. The secondary information also includes an indication that java script is enabled. The security processor 112 uses the secondary information to modify the soft information as needed. For example, upon receiving an indication that a client device 102 is using an OPPS browser, the security processor 112 updates coordinates of the text fields and 'submit' button to reflect how the OPPS browser is known to format and render text and graphics. In this manner, the secondary information is used by the security processor 112 to refine or alter the initial prediction made when the soft information was initially transmitted to the client device 102.

Flowchart of the Example Process

Figure 15:
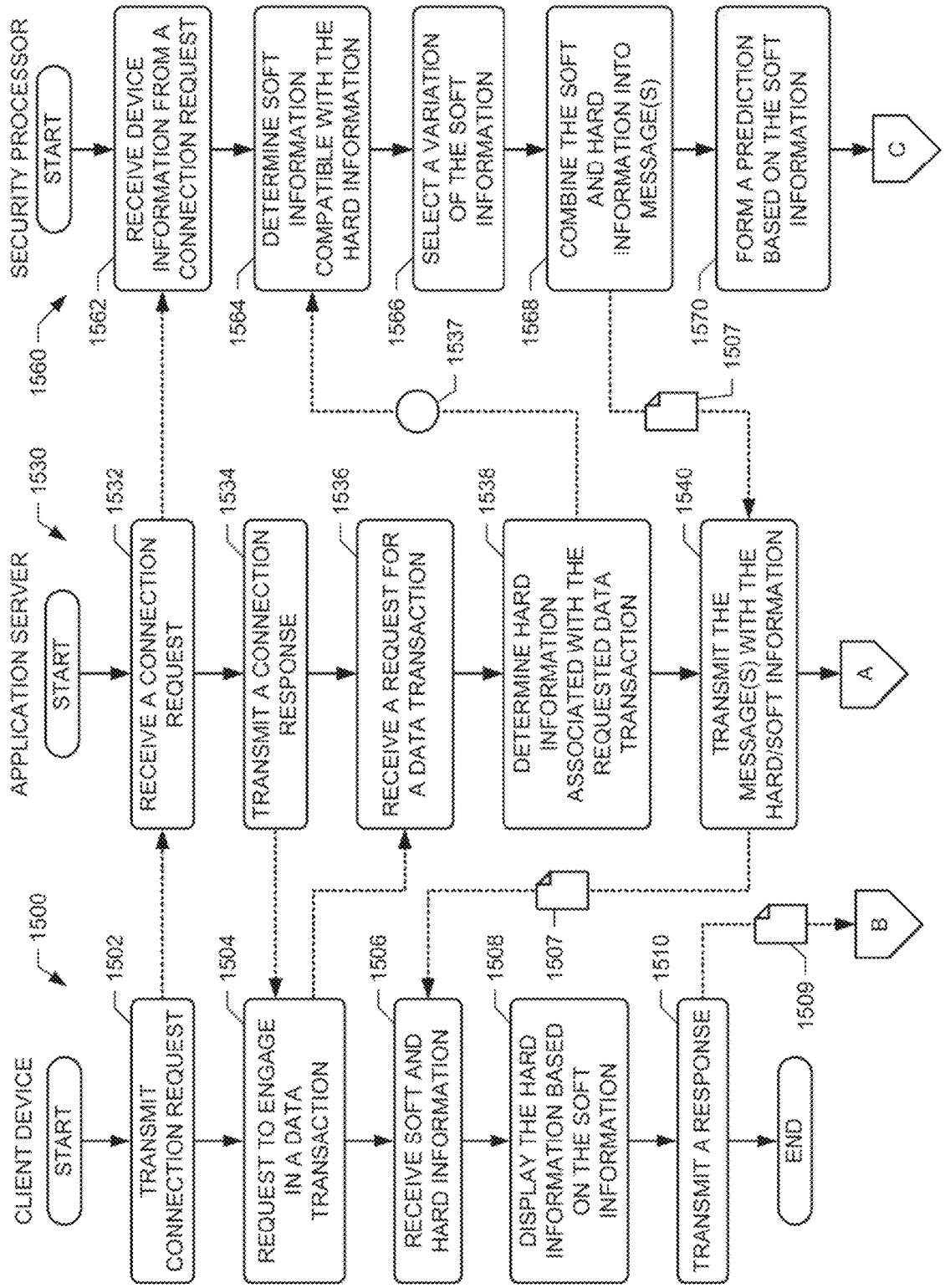
FIGS. 15 and 16 illustrate a flow diagram showing example procedures to validate a communication channel, according to an example embodiment of the present invention.
Figure 16:
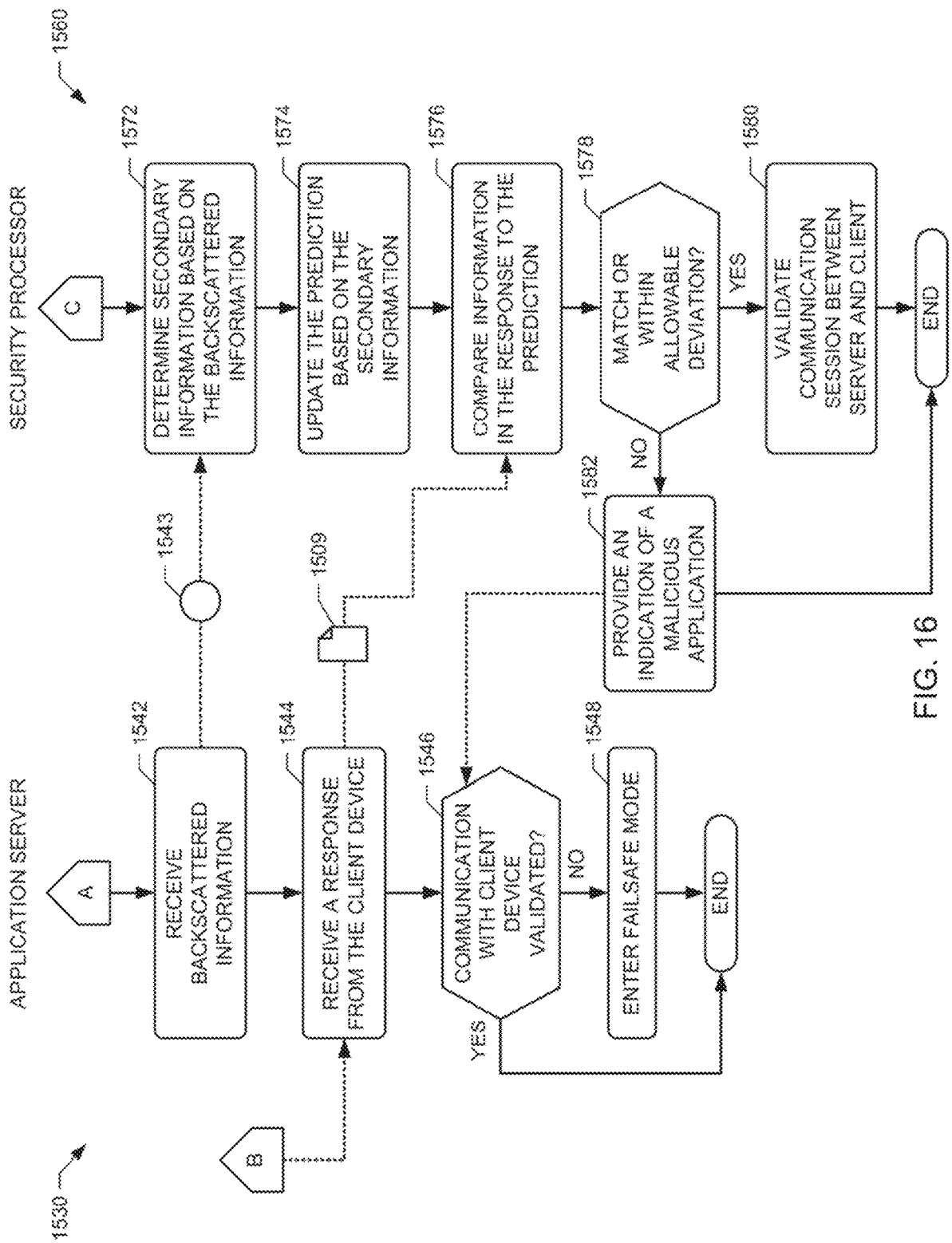

FIGS. 15 and 16 are a flow diagram showing example procedures 1500, 1530, and 1560 to validate a communication channel, according to an example embodiment of the present invention. Although the procedures 1500, 1530, and 1560 are described with reference to the flow diagram illustrated in FIGS. 15 and 16, it will be appreciated that many other methods of performing the acts associated with the procedures 1500, 1530, and 1560 may be used. For example, the order of many of the blocks may be changed, certain blocks may be combined with other blocks, and many of the blocks described are optional.

The example procedure 1500 operates on, for example, the client device 102 of FIGS. 1 to 6. The procedure 1500 begins when the client device 102 transmits a connection request to a server 104 (block 1502). The connection request can include a website address or IP address that is routed by the network 110 to the appropriate server 104. The connection request can also include device information identifying secondary characteristics or information associated with the client device 102.

After receiving a connection response, the client device 102 requests to engage in a data transaction with the server 104 (block 1504). The request can include a specification of information that the client device 102 desires to read or write to information stored in a database or managed by the server 104. The request can also include one or more transactions that the client device 102 desires to complete with the server 104.

Some time after transmitting the request, the client device 102 receives hard and soft information 1507 corresponding to the requested transaction (block 1506). The hard and soft information 1507 can be received in separate messages or combined together in one or more messages. The client device 102 uses the soft information to determine how the hard information is to be rendered and displayed (block 1508). After displaying the hard information, the client device 102 transmits a response message 1509 provided by a user (block 1510). At this point, the example procedure 1500 ends when the client device 102 and server 104 stop exchanging communications (e.g., terminate a communication session). Additionally, in some embodiments, the client device 102 may receive an indication from the server 104 that a malicious application has affected at least the information in the response message 1509. As a result, the client device 102 could re-authenticate communications with the server 104 or enter a failsafe mode.

The example procedure 1530 of FIG. 15 operates on, for example, the application server 104 of FIGS. 1 to 6. The procedure begins when the server 104 receives a connection request from a client device 102 (block 1532). In instances that the connection request includes device information, the server 104 transmits the device information to a communicatively coupled security processor 112. The server 104 then transmits a connection response to the client device 102, thereby initiating a communication session (block 1534).

Some time later, the server 104 receives from the client device 102 a request to process a data transaction (block 1536). The server 104 then determines hard information 1537 associated with the requested data transaction (block 1538). For example, a request to access an account causes the server 104 to identify account log-in information. In another example, a request to perform a banking transaction cases the server 104 to identify account information and available banking options for the account. The server 104 then transmits the determined hard information 1537 to a security processor 112. In some embodiments, the security processor 112 may be instantiated within the server 104. In other embodiments, the security processor 112 may be remote from the server 104.

Responsive to receiving hard and soft information 1507 from the security processor 112, the server 104 formats and transmits the information 1507 to the client device 102 (block 1540). In some embodiments, the server 104 receives messages with combined hard and soft information. In these embodiments, the server 104 formats the messages (e.g., structures the messages into data packets) for transmission. In other embodiments, the server 104 receives the hard and soft information. In these other embodiments, the server 104 combines the hard and soft information into one or more messages and formats these messages for transmission. The server 104 accordingly provides the client device 102 with hard and soft messaging.

After transmitting the hard and soft information 1507, the server 104 of FIG. 16 receives backscattered information 1543 from channel components used to process, route, and render the information 1507 (block 1542). The server 104 transmits this backscattered information 1543 to the security processor 112. In some instances, the server 104 transmits the information 1543 as the information is received. In other instances, the server 104 transmits the information 1543 periodically or after receiving an indication that the soft and hard information 1507 has been received and processed by the client device 102.

The server 104 then receives the response message 1509 from the client device 102 including information responding to the hard information (block 1544). The server 104 subsequently transmits the response message 1509 to the security processor 112. After the security processor 112 has compared information in the response message 1509 to a prediction, the server 104 determines whether the communication session with the client device has been validated (block 1546). If the security processor 112 does not provide an indication of a malicious application, the server 104 determines the communication session with the client device 102 is validated. The server 104 continues communications with the client device 102 and continues to validate communications until the communication session is ended.

However, responsive to the security processor 112 providing an indication of a malicious application, the server 104 enters a failsafe mode (block 1548). The failsafe mode can include the server 104 informing the client device 102 of the malicious application, requesting that the client device 102 re-authenticate, restricting access to the data transactions associated with the client device 102, transmitting an alarm or alert to appropriate personnel, and/or applying a routine or algorithm to remove or restrict further attempts by the malicious application to affect communications. Regardless of which failsafe operation is performed, the example procedure 1530 ends when the communication session with the client device 102 is terminated or when the effects of the malicious application have been remedied.

Returning to FIG. 15, the example procedure 1560 operates on, for example, the security processor 112 of FIGS. 1 to 6. The procedure 1560 begins when the security processor 112 receives device information from the server 104 (block 1562). This step can be skipped in instances where a connection request does not include device information. The security processor 112 then receives hard information 1537 from the server 104 and identifies compatible soft information (block 1564). For instance, hard information has a limited number of ways that it can be correctly displayed. The security processor 112 uses this relationship to identify which soft information is compatible with the hard information.

After identifying the compatible soft information, the security processor 112 selects a variation of the soft information (block 1566). The security processor 112 may select a different variation of soft information for each client device-server connection. As described before, this variation prevents malicious applications from reverse engineering the soft messaging used to validate communications. The security processor 112 then combines the hard information and the selected soft information 1507 into one or more messages and transmits combined information 1507 to the server 104, which then transmits the information 1507 to the client device 102 (block 1568). The security processor 112 also forms a prediction as to how the client device 102 will render and display the hard information based on the soft information (block 1570).

In FIG. 16, the security processor 112 receives the backscattered information 1543 from the server 104 and determines corresponding secondary information or characteristics (block 1572). The security processor 112 then updates or modifies the prediction based on the secondary information (block 1574). Responsive to receiving the response message 1509 from the client device 102, the security processor 112 compares the information in the response to the prediction (block 1576). The comparison includes determining if soft information returned by the client device 102 matches or is within an allowable deviation to corresponding soft information in the prediction (e.g., matching coordinates of graphics or data fields, matching programmatically entered characters, or matching font information) (block 1578).

Responsive to determining the information in the response matches the prediction, the security processor 112 validates the communication session between the server 104 and the client device 102 (block 1580). The security processor 112 then continues to validate the communication session for additional communications between the server 104 and the client device 102 until the communication session is ended. Responsive to determining the information in the response deviates from the prediction, the security processor 112 provides an indication of a malicious application (block 1582). The security processor 112 may also remedy the effects of the malicious application or take steps to prevent the malicious application from affecting further communications between the client device 102 and the server 104. The security processor 112 then continues to validate the communication session for additional communications between the server 104 and the client device 102 until the communication session is ended.

It will be appreciated that all of the disclosed methods and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor, which when executing the series of computer instructions performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An apparatus comprising:
   a processor; and
   a memory storing machine-readable instructions, which when executed by the processor cause the processor to:
   store information to a data structure as a predicted response from a client device, the information indicative of graphically rendered text or images at the client device corresponding to (i) transactional information that includes content for controlled usage of a website resource that is related to a website, and (ii) presentation information specifying at least one of how the transactional information is to be graphically rendered or how the transactional information is to be graphically assembled, and
   during a subsequent access of the website:
   receive, from the client device, a request message related to the website,
   responsive to the request message, select the transactional information or second transactional information to transmit to the client device, the transactional information or the second transactional information including text or images for controlled usage of the website resource or a second website resource that is related to the website,
   select the presentation information corresponding to the transactional information or second presentation information corresponding to the second transactional information to transmit to the client device, the presentation information or the second presentation information specifying at least one of how the transactional information or the second transactional information is to be graphically rendered or how the transactional information or the second transactional information is to be graphically assembled,
   transmit at least one message including the presentation and transactional information or the second presentation and second transactional information to the client device, causing the client device to graphically render the transactional information or the second transactional information based on the presentation information or the second presentation information,
   receive second information indicative of the graphically rendered text or images at the client device,
   compare the second information to the stored predicted response, and
   determine a malicious application is attempting to affect the controlled usage of the website resource or the second website resource when the received second information does not match the stored predicted response.

2. The apparatus of claim 1, wherein the processor is further configured to determine the predicted response based on the information indicative of the graphically rendered text or images at the client device in conjunction with at least some of the transactional information or the presentation information.

3. The apparatus of claim 1, wherein the processor is further configured to:
   receive, from the client device, client device information including at least one of a type of an operating system, a type of the client device, a type or version of a web browser accessing the website, a screen size of the client device, or a screen orientation of the client device; and
   determine the predicted response based on the information indicative of the graphically rendered text or images at the client device in conjunction with the client device information.

4. The apparatus of claim 1, wherein the processor is further configured to:
   receive, from the client device, webpage information including at least one of cascading style sheet information, script information, document object model information, javacode information, or byte script information; and determine the predicted response based on the information indicative of the graphically rendered text or images at the client device in conjunction with the webpage information.

5. The apparatus of claim 1, wherein the information indicative of the graphically rendered text or images at the client device includes locations of rendered page geometry of at least some of the graphically rendered text or images.

6. The apparatus of claim 1, wherein the text includes at least one of a username, a session identifier, noise, username authentication information, or username validity information.

7. The apparatus of claim 1, wherein the presentation information includes at least one of protocol information, formatting information, positional information, rendering information, style information, transmission encoding information, information describing how different layers of a style sheet are to be rendered by the client device, or information changing a definition of a function in a code library at the client device.

8. The apparatus of claim 1, wherein the transactional information includes at least one of a) a data entry field in a webpage for a user of the client device to provide information associated with the controlled usage of the website resource, or b) text, data, and images for display within the webpage that provide information related to the controlled usage of the website resource.

9. The apparatus of claim 1, wherein the processor is part of an application server or a database server.

10. The apparatus of claim 9, wherein the website is also part of the application server or the database server.

11. The apparatus of claim 1, wherein the processor is further configured to responsive to detecting the malicious application, at least one of restrict access of the client device to the website or transmit an alert.

12. The apparatus of claim 1, wherein the processor is further configured to enable the controlled usage of the website resource or the second website resource to be completed when the received second information matches the stored predicted response.

13. The apparatus of claim 12, wherein completing the controlled usage of the website resource or the second website resource includes at least one of enabling the client device to access a webpage of the website, storing/processing data provided by the client device, or carrying out a financial action.

14. An apparatus comprising:
a processor;
a data structure storing information as a predicted response for a client device, the information indicative of graphically rendered text or images at the client device corresponding to (i) transactional information that includes content for controlled usage of a website resource that is related to a website, and (ii) presentation information specifying at least one of how the transactional information is to be graphically rendered or how the transactional information is to be graphically assembled; and
a memory storing machine-readable instructions, which when executed by the processor cause the processor to:
during an access of the website:
responsive to a request message from the client device related to the website, select the transactional information or second transactional information to transmit to the client device, the transactional information or the second transactional information including text or images for controlled usage of the website resource or a second website resource that is related to the website,
select the presentation information corresponding to the transactional information or second presentation information corresponding to the second transactional information to transmit to the client device, the presentation information or the second presentation information specifying at least one of how the transactional information or the second transactional information is to be graphically rendered or how the transactional information or the second transactional information is to be graphically assembled,
transmit at least one message including the presentation and transactional information or the second presentation and second transactional information to the client device, causing the client device to graphically render the transactional information or the second transactional information based on the presentation information or the second presentation information,
receive second information indicative of the graphically rendered text or images at the client device,
compare the second information to the stored predicted response, and
determine a malicious application is attempting to affect the controlled usage of the website resource or the second website resource when the received second information does not match the stored predicted response.

15. The apparatus of claim 14, wherein the processor is further configured to enable the controlled usage of the website resource or the second website resource to be completed when the received second information matches the stored predicted response.

16. The apparatus of claim 15, wherein completing the controlled usage of the website resource or the second website resource includes at least one of enabling the client device to access a webpage of the website, storing/processing data provided by the client device, or carrying out a financial action.

17. The apparatus of claim 14, wherein the processor is further configured to responsive to detecting the malicious application, at least one of restrict access of the client device to the website or transmit an alert.

18. The apparatus of claim 14, wherein the presentation information includes at least one of protocol information, formatting information, positional information, rendering information, style information, transmission encoding information, information describing how different layers of a style sheet are to be rendered by the client device, or information changing a definition of a function in a code library at the client device.

19. The apparatus of claim 14, wherein the transactional information includes at least one of a) a data entry field in a webpage for a user of the client device to provide information associated with the controlled usage of the website resource, or b) text, data, and images for display within the webpage that provide information related to the controlled usage of the website resource.

20. The apparatus of claim 14, wherein the processor is further configured to determine the predicted response based on the information indicative of the graphically rendered text or images at the client device in conjunction with at least some of the transactional information or the presentation information.

* * * * *